(12) United States Patent
Erlich et al.

(10) Patent No.: US 8,241,430 B2
(45) Date of Patent: Aug. 14, 2012

(54) DIRECTIONAL CONTROL METHOD FOR DUAL BRUSH ROBOTIC POOL CLEANERS

(75) Inventors: Giora Erlich, North Caldwell, NJ (US); Tibor Horvath, Estero, FL (US)

(73) Assignee: Aqua Products, Inc., Cedar Grove, NJ (US)

( * ) Notice: Subject to any disclaimer, the term of this patent is extended or adjusted under 35 U.S.C. 154(b) by 1283 days.

(21) Appl. No.: 11/824,447

(22) Filed: Jun. 29, 2007

(65) Prior Publication Data

US 2008/0087299 A1 Apr. 17, 2008

Related U.S. Application Data

(63) Continuation-in-part of application No. 10/542,158, filed as application No. PCT/US2004/037148 on Nov. 4, 2004, now Pat. No. 7,849,547.

(60) Provisional application No. 60/517,352, filed on Nov. 4, 2003.

(51) Int. Cl.
  *B08B 7/04* (2006.01)
  *E04H 4/16* (2006.01)
(52) U.S. Cl. ..... 134/18; 134/56 R; 134/57 R; 134/58 R; 15/1.7
(58) Field of Classification Search ............... 134/6, 18, 134/21, 56 R, 57 R, 58 R; 15/1.7
  See application file for complete search history.

(56) References Cited

U.S. PATENT DOCUMENTS

| | | | | |
|---|---|---|---|---|
| 2,988,762 A * | 6/1961 | Babcock | | 15/1.7 |
| 4,518,437 A * | 5/1985 | Sommer | | 134/18 |
| 4,786,334 A * | 11/1988 | Nystrom | | 134/21 |
| 4,835,809 A * | 6/1989 | Roumagnac | | 15/1.7 |
| 5,256,207 A | 10/1993 | Sommer | | |
| 5,351,355 A * | 10/1994 | Chiniara | | 15/1.7 |
| 5,369,347 A * | 11/1994 | Yoo | | 318/568.12 |
| 5,435,031 A * | 7/1995 | Minami et al. | | 15/1.7 |
| 5,507,058 A * | 4/1996 | Minami et al. | | 15/1.7 |
| 5,569,371 A * | 10/1996 | Perling | | 210/85 |
| 5,720,077 A * | 2/1998 | Nakamura et al. | | 15/340.1 |
| 5,995,884 A * | 11/1999 | Allen et al. | | 701/24 |
| 6,099,658 A * | 8/2000 | Porat | | 134/18 |
| 6,119,293 A * | 9/2000 | Phillipson et al. | | 15/1.7 |
| 6,299,699 B1 * | 10/2001 | Porat et al. | | 134/6 |
| 6,309,468 B1 * | 10/2001 | Sommer | | 134/18 |
| 6,398,878 B1 * | 6/2002 | Henkin et al. | | 134/18 |
| 6,412,133 B1 * | 7/2002 | Erlich et al. | | 15/1.7 |
| 6,815,918 B2 * | 11/2004 | Porat et al. | | 318/568.12 |
| 2003/0102014 A1 * | 6/2003 | Yoshino | | 134/21 |
| 2003/0159723 A1 * | 8/2003 | Hui | | 134/167 R |
| 2004/0045104 A1 | 3/2004 | Pichon | | |
| 2006/0237037 A1 * | 10/2006 | Kim | | 134/18 |
| 2007/0067930 A1 * | 3/2007 | Garti | | 15/1.7 |
| 2009/0301522 A1 * | 12/2009 | Abehasera et al. | | 134/18 |
| 2010/0288307 A1 * | 11/2010 | Chung et al. | | 134/18 |
| 2011/0226282 A1 * | 9/2011 | Choi et al. | | 134/18 |

* cited by examiner

*Primary Examiner* — Michael Kornakov
*Assistant Examiner* — Katelyn Whatley
(74) *Attorney, Agent, or Firm* — Abelman, Frayne & Schwab

(57) ABSTRACT

A method for accurately controlling the directional and turning movement of a self-propelled robotic pool cleaner while cleaning a pool includes the steps of propelling the pool cleaner in a first direction along a generally straight path from a first sidewall toward an opposing sidewall of the pool, wherein said pool cleaner is propelled to a position in the pool corresponding to a distance greater than the midpoint between the first sidewall and the opposing sidewall and before contacting the opposing sidewall of the pool; stopping the pool cleaner at the position and pivoting the pool cleaner to a predetermined angular change in direction; and reversing direction and resuming propulsion of the pool cleaner, wherein the pool cleaner moves in a second direction along a generally straight path that is angularly displaced from the first direction.

12 Claims, 13 Drawing Sheets

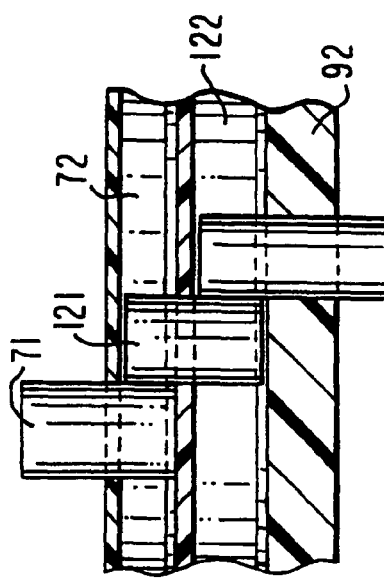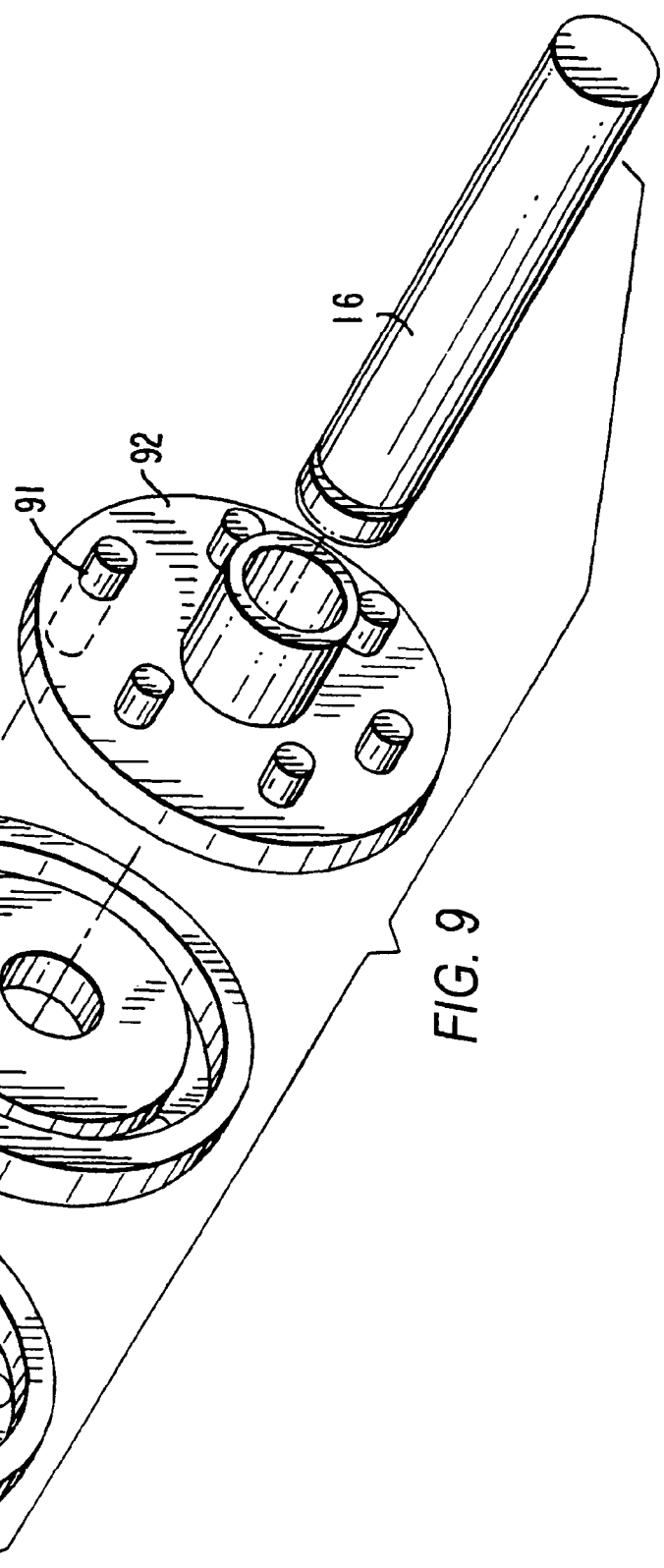

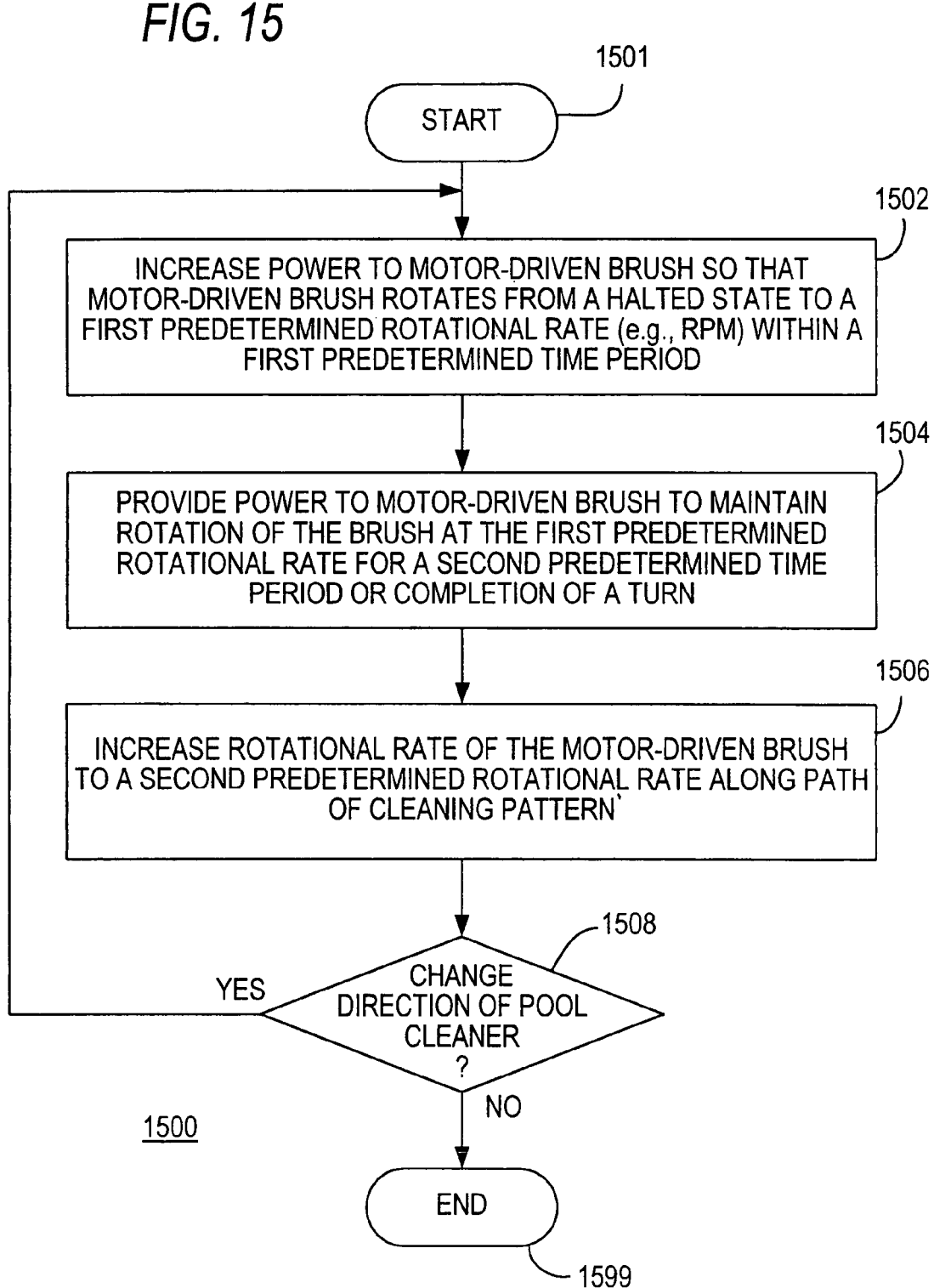

DIRECTIONAL CONTROL METHOD FOR DUAL BRUSH ROBOTIC POOL CLEANERS

CROSS REFERENCE TO RELATED APPLICATION

This patent application is a Continuation-in-Part of U.S. patent application Ser. No. 10/542,158, filed Mar. 23, 2006, now U.S. Pat. No. 7,849,547, which claims priority to International Application No. PCT/US2004/037148, filed on Nov. 4, 2004, which claims the benefit of U.S. Provisional Application Ser. No. 60/517,352, filed Nov. 4, 2003, the contents of all of which are incorporated by reference herein.

FIELD OF THE INVENTION

This invention relates to the directional control of self-propelled automated pool and tank cleaners that are supported by moving rotational support members positioned at opposing ends of the cleaner housing.

BACKGROUND OF THE INVENTION

A wide variety of methods and apparatus for controlling the patterns of movement of tank and swimming pool cleaners have been disclosed in the prior art. The overriding purpose of these controls is to assure that the cleaner passes over substantially the entire surface to be cleaned during the time allotted for cleaning. In the case of tanks and above-ground swimming pools, the robotic cleaner generally makes contact only with the bottom surface of the tank or pool. In the case of in-ground swimming pools, the pool cleaner is designed to climb the side walls, typically to the water line, and then reverse the direction of movement to descend the side wall and resume a cleaning path across the bottom surface of the pool. In some wall cleaning units, the pool cleaner actually moves along the wall as part of its predetermined patterned movement so that its descent is along a different path. In many cases, the pattern of movement is random and the pool cleaner must be operated for many hours, and even then with no real assurance that some surfaces will not be missed.

As used herein, the terms "pool" and "pool cleaner" include commercial and industrial tanks, troughs, basins and the like and tank cleaners.

Pool cleaners of the prior art include those that are supported by a pair of endless tracks or belts that are independently driven by a pair of motors or by a single motor, and those that are supported on generally cylindrical cleaning brushes that in turn are driven by a system of sprockets and pulleys. The moving brushes can be made from a ribbed solid polymer web that is formed into a cylindrical supporting surface or, alternatively, from a foamed polymer material that is either smooth or highly textured and resilient.

In order to control the patterned movement of the pool cleaner, it has been the practice in the art to provide a programmed processor used in conjunction with a controller to stop, start and/or reverse the direction of the driving motor or motors. It is also known in the art to control the orientation of the pool cleaner on the surface to be cleaned by interrupting the power to the pump motor and impeller to create a torsional force sufficient to turn the entire pool cleaner body. In other cases, the processor is provided with a complex algorithm which is designed to move the pool cleaner for a predetermined period of time before changing direction or, in other cases, to cause it to move randomly across the surfaces to be cleaned with the expectation that, given sufficient time, the pool cleaner will in fact cover all submerged surfaces to be cleaner. Devices have also been disclosed that include one or more sensors for detecting a side wall or other obstruction for the purpose of generating a signal that is sent to the processor to cause some change in the operating program of the cleaner.

As will be understood by one of ordinary skill in the art, the cost associated with the design and assembly of a pool cleaner having more than one drive motor is significant. When this is combined with the expense associated with the design and fabrication of integrated circuit devices and processors embodying complex programs and algorithms and the associated controllers, it will be apparent that additional substantial expenses will be incurred. Moreover, the mechanical linkages associated with the dual drive motors are sources of wear and potential failure that require maintenance.

It is therefore an object of this invention to provide a relatively simpler and less expensive apparatus and method for controlling the direction of movement of a tank and pool cleaner as compared to those of the prior art that requires only one drive motor.

It is a further object of the invention to provide a pool cleaner directional control apparatus and method that will function in tank and pool cleaners adapted to cleaning only the bottom surface, but that will also ascend the side walls of a pool, while at the same time establishing a regular and regulated pattern of movement that will assure cleaning contact with all surfaces in a relatively short period of time.

A further object of the invention is to provide a directional control system for a pool cleaner that utilizes a relatively simple processor program, including one that can be adjusted for customized for use with a given style and/or size of pool.

SUMMARY OF THE INVENTION

The above objects and further advantages are achieved with the method and apparatus of the invention in which the pool cleaner body is supported on a pair of co-axially mounted, but separate rotational support members (e.g., brushes) positioned at opposing ends of the pool cleaner housing, one of each of the pair of brushes being driven by a common drive means, e.g., a belt attached to a single drive motor. The driven brushes will alternately assume a leading and trailing position, depending upon the direction of movement of the cleaner. Each of the driven brushes is operably connected to the respective adjacent free brush by a rotational delay clutch mechanism. Both brushes are preferably mounted for axial rotation on a common axle.

The direction of rotation of the drive motor, and thereby the direction of movement of the pool cleaner, is determined by the programmed processor and associated controller. When the direction of the drive motor is changed, the rotational delay clutch disengages the driven brush from the adjacent free brush for a predetermined degree or amount of arcuate movement or rotation by the driven brush. The free brush stops moving for a predetermined number of partial and/or full turns of the driven brush. This has the effect of causing a turning or pivoting movement around the stationary free brushes.

After the predetermined degree of rotational movement by the leading and trailing brushes on one side of the cleaner housing, the clutch engages the adjacent leading and aft free brushes so that both pairs of brushes at either end of the unit are again moving synchronously and the cleaner advances in a straight line.

The method and apparatus of the invention broadly contemplates utilizing the differential angular rotational movement of one-side of a pair of supporting brushes respectively positioned at the fore and aft ends of the pool cleaner to effect a turning or pivotal movement of the pool cleaner and then engaging the respective adjacent free brush, whereby the differential rotational movement is eliminated and the adjacent driven and free brushes rotate at the same angular rate. In one preferred embodiment, the drive and free brushes are mounted on a common axle. However, other mounting arrangements are mechanically possible and within the scope of the invention.

It will be understood that the differential angular rotational movement of the driven and free adjacent brushes can be achieved by entirely interrupting the rotation of the free brush, but that a differential rotational speed can also be effected with a lower rate of rotation of the free brush to achieve substantially the same result, i.e., the turning of the pool cleaner to move in a different angular direction.

As will be understood by one of ordinary skill in the art, the degree of the change in the direction of the pool cleaner path after each leg will be determined by a number of factors. These include the width of the pool cleaner; the diameter/circumference of the contact surfaces of the brushes; the number of full and/or partial revolutions made by the driven brush before the free brush assumes a synchronous speed of rotation; the frictional force effects between the contact surface of the brushes as determined by the pool surface, e.g., glazed tile versus textured concrete; and the nature of the brushes, e.g., molded polyvinyl chloride, expanded polymeric foam having a smooth surface and polymeric foam with a resilient textured surface. For example, a pool cleaner having brushes with a three-inch diameter will have a circumference of about nine and one-half inches. A full turn of the fore and aft brushes will theoretically move one end of the pool cleaner a distance somewhat less than nine inches from its starting point. Frictional forces, inertia and the overall movement of the pool cleaner will reduce the actual distance somewhat.

As will be apparent to one of ordinary skill in the art, the configuration of the pool cleaner, including particularly the size of the brushes, and its relative width, as well as the conditions in the pool or tank in which the machine is to be operated must be taken into account in applying the method and apparatus of the invention. The program design and implementation are well within the skill of the art of programmers familiar with the operation and control of robotic tank and pool cleaners of the prior art.

In one preferred embodiment, a first clutch member is secured to the interior end of each of the driven brushes and the opposing surface of the free brush; a projecting pin or other form of engagement member extends from the driven clutch plate towards the opposing interior surface of the second or free plate which is provided with a groove for receiving the projecting pin in rotationally sliding relation. The groove in the free clutch plate also includes a stationary engagement member. When the driven clutch plate is caused to rotate, its projecting pin will rotate in the groove in the free plate until it reaches the projecting engagement member in the free brush clutch plate, after which the two will move synchronously.

When the direction of rotation of the driven brush is reversed, the projecting pin in the driven plate will move approximately one full rotation in the groove until it reaches the engagement member in the free plate. As will be understood from the description of this embodiment, with each change in direction, the free brush remains stationary while the driven brush moves through approximately one full rotation before the clutch members are fully engaged and synchronous rotation is resumed.

In a modification of this embodiment, an intermediate clutch plate that is grooved on one side and includes projecting engagement members on its opposing surfaces is inserted between the driven and the free clutch plate faces. When the direction of rotation of the drive motor is reversed, the projecting pin on the face of the driven clutch plate moves approximately one full rotation before engaging the corresponding pin in the adjacent intermediate plate, thereby causing it to also rotate. The projecting pin on the opposing side of the intermediate plate continues to rotate in a corresponding groove in the adjacent free clutch plate, but without moving the free plate until it reaches the free plate's engagement member. This arrangement provides for almost two complete rotations by the driven brush before the free brush begins to move synchronously.

In a further modification of this embodiment, the opposing sides of the intermediate clutch plate are both provided with a groove and an engagement member. In this embodiment, an additional nearly complete rotation is completed before the free brush clutch plate is engaged and causes the synchronous turning of the free brush to which it is attached.

In a further modification of this embodiment, a plurality of intermediate clutch plates, constructed in accordance with the description of the single grooved intermediate clutch plate or the double grooved intermediate clutch plate of the previous embodiments, are inserted on a common axis of rotation with the opposing clutch plates mounted on the free and driven brushes. As will be understood from the prior descriptions, each intermediate clutch plate can provide one or two almost complete further rotations.

It will also be apparent that the width of the respective projecting pins and of the engagement members will reduce the angular rotation from 360°. The amount of this reduction can be minimized by minimizing the size of the projecting and engagement members, i.e., by using a relatively narrow strip of corrosion-resistant metal, e.g., stainless steel; or by molding or machining the grooves to leave a relatively narrow web of material in each of the opposing faces.

In a further preferred embodiment of a mechanical delay clutch mechanism in accordance with the method and apparatus of the invention, the opposite ends of a length of flexible wire or similar material is attached to the opposing faces of the driven and free brushes. As the driven brush rotates in one direction, the wire is wrapped around the axle on which the brushes are mounted until all slack has been taken up, at which point the free brush begins to rotate synchronously. When the direction of rotation of the drive motor is reversed, the corresponding change in direction of rotation of the driven brush causes slack to form in the wire as it is unwrapped from the axle in the first direction and the free wheel ceases to move. This effect continues until the driven brush has rotated sufficiently to again take up the slack around the axle, at which point the free brush begins to move synchronously with the driven brush.

In this embodiment, the extent of the angular rotation of the driven brush before the free brush begins to move is the subject of several variables, including the length of the wire, the diameter of the axle around which the wire must be wrapped and the relative radial position at which the respective ends of the wire are mounted on the opposing faces of the free and driven brushes.

As used herein, the term wire will be understood to include braided stainless steel wire, braided nylon, nylon monofilament, cording formed of aromatic polyamide fibers, and other man-made and natural fibers and materials that are able to be repeatedly wound and unwound while resisting bending fatigue and/or work hardening and undue stretching under tension.

In another preferred embodiment, a variably expandable member, e.g., a bladder, is positioned between a housing on the driven brush and a corresponding housing on the free brush and a pressurized fluid is gradually added to the expandable member when the direction of rotation of the driven brush is reversed so that there is a predetermined period of differential movement between the free brush and the driven brush. When the drive motor is stopped prior to reversing its direction, the pressurized fluid is discharged from the inflatable member which retracts or deflates from its position of engagement with the housing member attached to, or associated with the free brush. In this embodiment, a pressurized stream of water from the pool can conveniently be introduced into the expandable member, e.g., a polymeric bladder that gradually expands radially and/or axially in the direction of the housing mounted on the opposing end of the free brush. When the motor stops, the bladder is depressurized and the fluid is discharged, thereby disengaging the free brush from the driven brush and causing the cleaner to change its direction of movement.

In a further embodiment, the opposing end faces of the driven and free brushes are provided with an orbital gear system, the size and number of gear teeth on the respective central and orbital gear members being predetermined to provide disengagement of the free brush in order to effect the desired degree of turning of the pool cleaner.

An electro-magnetic clutch can also be utilized with the activation of the engagement of the clutch plates is programmed into the processor. In the embodiment utilizing an electro-magnetic mechanism, the driven brushes operate independently of the free brushes for a predetermined amount of time to complete the turning of the body and then the electro-magnetic clutch is powered to cause the free brushes to move synchronously with the driven brushes. The program controller disengages the electro-magnetic clutch at the same time that the drive motor stops; thereafter a timer in the controller is initiated when the drive motor is started in the opposite direction and the process steps are repeated.

In a related embodiment, the electro-mechanical clutch is spring-biased toward engagement to produce synchronous movement of the driven and free brushes; disengagement is intermittent for the purpose of effecting a change in direction. The method of operation is preferred when a battery provides the power.

As will be apparent to one of ordinary skill in the art, other methods and apparatus can be utilized to effect the differential movement between the driven and free brushes based upon a timed interval or predetermined amount of angular rotation in order to effect the desired change in direction of the pool cleaner following stopping and reversing of the drive motor. For example, a solenoid can be actuated to urge an axially displaceable clutch plate on either of the driven or free brushes into or out of mating engagement with the opposing clutch plate. Any of a number of other electro-mechanical constructions can be utilized in order to achieve the desired result.

It is to be understood that the pump motor which provides a force vector in the direction of the surface on which the pool cleaner is moving runs continuously throughout the operation of the pool cleaner in accordance with the method of the invention. This downward thrust maintains the pool cleaner traction means in contact with the surface at all times. This is an improvement over prior art methods in which the pump motor is stopped or its rotational speed greatly decreased to reduce the frictional forces between the brushes and the pool surface during turning maneuvers. In accordance with the present invention, by stopping the movement of brushes on one side of the cleaner while rotating the respective adjacent brushes on the opposite side of the cleaner, provides sufficient traction to cause the unit to turn into the new desired direction of travel before synchronizing the movement of the respective adjacent brushes, without reducing the downward force vector that serves to maintain the nearly neutrally buoyant pool cleaner on the horizontal or vertical surface over which it is moving.

Directional Control Program

In a further aspect, the invention also contemplates a novel program and system for controlling the movement of the pool cleaner in a highly efficient repetitive pattern that will cause the pool cleaner to pass over substantially the entire surface of the pool or tank that is to be cleaned, regardless of it's external configuration, e.g., rectilinear, curvilinear or a combination of the two. The directional control program is adapted to cleaning only the bottom surface of a pool or tank, as well as efficiently controlling the movement of a pool cleaner in the cleaning of both the bottom and the side walls of the pool.

In one preferred embodiment, the programmed directional movement of the pool cleaner is along a first longer leg for a predetermined period of time; the drive motor stops and the direction is reversed; the driven brushes at either end of one side of the pool cleaner turn at a greater rotational velocity than the free brushes for a predetermined number of revolutions to thereby cause the cleaner body to turn; the free brushes are then engaged for synchronous movement with the respective adjacent driven brushes and the pool cleaner advances along a second leg for a shorter period of time at the end of which the drive motor stops and reverses direction; the above steps are repeated for a predetermined number of cycles after which the power to the drive motor continues uninterrupted for a time that is approximately twice the time allotted for the longer leg; after the extended running time, the drive motor is stopped and its direction reversed; the original steps are repeated for the same predetermined number of cycles as above.

In programming the processor, the times allotted for the pool cleaner to traverse the relatively longer and shorter legs is determined with reference to the speed of the motor, the diameter/circumference of the brushes and the size of the pool or tank in which the cleaner is to operate. For example, a high speed drive motor can produce a speed of about 60 feet per minute in a belt-driven pool cleaner while a conventional (lower) speed motor will produce a cleaner speed of about 30 feet per minute across the bottom surface of the pool.

In one preferred embodiment, the shorter leg of travel is sufficient to cause the pool cleaner to traverse a distance that exceeds half of the bottom width of the pool. In the case of a pool cleaner equipped with a conventional or low speed motor, the length of time allotted for a complete cycle is one minute with the longer leg being allotted 36 seconds and the shorter leg 24 seconds. In this embodiment, after thirty such cycles, the order of long and short legs is reversed. In this mode of operation the pool cleaner moves from one side of the pool via a zigzag path until it reaches the other side of the pool. When this occurs, the relative direction of the cleaning pattern will be reversed, i.e., if the pool cleaner was moving in a counter-clockwise direction around the periphery of the pool for the previous thirty cycles, after the cleaner has crossed the pool and reaches the opposite water line, the next thirty cycles will be in a clockwise direction with respect to the periphery of the pool.

In this mode of operation, it has been found that a pool cleaner employing the method and apparatus of the invention, equipped with a high speed motor and a resultant angular change in direction of about 15° to 60°, when operated in a large, residential swimming pool of a irregular curvilinear configuration traversed the perimeter approximately 3½ times in one hour.

Optional Battery Operation

In accordance with the invention, the highly efficient mode of operation of the pool cleaner, with a single drive motor in combination with a highly efficient cleaning pattern, enables the unit to be powered by an on-board rechargeable battery. A further advantage of the apparatus and method of the invention is that it obviates the need to have the pool cleaner move horizontally along the waterline of the pool in order to assume a new direction of movement once the drive motor is reversed.

The elimination of the floating power cable from an external power source renders the pool cleaner even more efficient and eliminates any possibility that the program will be interrupted by the forces applied to the nearly neutral buoyant pool cleaner. Battery-powered operation also eliminates the risk that the power cable will interfere with the movement of the brushes when the unit is operating at the waterline.

Use of Mercury Switch

In yet a further preferred embodiment of the invention, the processor and controller circuit includes a mercury switch that is actuated when the pool cleaner body moves from a generally horizontal position to an angle of about 70° or more at either end. The signal initiates a timed-operational period after which the drive motor is stopped and reversed. Thus, as the pool cleaner approaches a side wall and moves from a generally horizontal to a generally vertical orientation, the movement of the mercury switch completes a circuit that produces a signal received by the processor that actuates a time clock circuit. After a predetermined period of time, which can be, e.g., eight seconds to twenty seconds, the drive motor is stopped and its direction reversed. The predetermined time interval following receipt of the signal from the mercury switch can be sufficient to insure that the pool cleaner will reach the water line of the pool before the motor reverses direction.

In this embodiment, the shorter leg of travel is preferably sufficient to cause the pool cleaner to traverse approximately one-half of the width of the pool during each cycle; the longer leg of travel need not be predetermined in the operating program, since the pool cleaner will eventually generate a signal via the mercury switch as the unit begins its ascent of a wall.

As in the prior preferred embodiment, the processor can preferably be programmed to operate in a cyclic mode with a periodic change in direction of movement from counter-clockwise to clockwise and vice versa.

In the embodiment in which two motors are employed to drive each of the co-axially mounted, but independent pair of brushes, the program of the processor can include the step of reversing the direction of rotation after a predetermined number of cycles. This will allow the pool cleaner to change from a clockwise pattern of movement with respect to the periphery of the swimming pool to a counter-clockwise pattern without the requirement that the pool cleaner completely traverse the bottom and, if appropriate, opposite side wall of the pool as was described in the single drive motor embodiments described above.

When the pool cleaner reaches the waterline, the longitudinal axis of the pool cleaner will generally become oriented in a direction that is normal to the waterline before the timed stopping and reversal of the drive motor. In this configuration, the unit makes the angular turn to change direction when the drive motor causes the rotation of one of each pair of the fore and aft brushes that are positioned on the same side of the cleaner housing. In the event that the pool cleaner has approached the waterline at a relatively small acute angle and the timed operation from the generation of the mercury switch signal is insufficient to permit the unit to assume a generally vertical position on the side wall, the pool cleaner will, nevertheless return to the bottom along a different path from the waterline. Moreover, a pool cleaner constructed and operating in accordance with the improved programmed control method of the invention will not be adversely effected with respect to its ability to cover the surfaces to be cleaned during the time allotted for completing the cleaning of the pool.

Two Drive Motor Alternative Embodiment

Although the preferred embodiments of the invention as described above operate most efficiently with a single drive motor with a delayed starting of one of a pair of co-axial adjacent brushes using mechanical means to effect the delay that is followed by synchronous rotation of the brushes, this highly efficient cleaning pattern can also be accomplished utilizing a second drive motor. In the embodiment utilizing two drive motors, no clutch or other delayed linking mechanism is required. Each one of the pair of fore and aft brushes turns separately in response to the action of the independent drive motors. The processor is programmed to operate one of the drive motors in the manner that was described above in the embodiments with a free brush. The predetermined delay in starting the rotation of the adjacent brush is entered into the processor program so that the same end result is achieved in terms of patterned movement, but without the mechanical linkage between the adjacent brushes at either end of the pool cleaner body.

As will be apparent to one of ordinary skill in the art, the use of a second drive motor increases the cost of materials and labor in assembling the pool cleaner, adds to its weight, as well as increasing the operating and maintenance expense. The addition of the second drive motor may also render it impractical to utilize a self-contained battery mounted in the pool cleaner body, since the power drain will be substantially increased.

Controlled Rotation of the Brushes to Prevent Slippage

In another embodiment of the invention, a method is provided to minimize or prevent a self-propelled robotic pool cleaner, which includes at least one pair of power-driven rotational support members (e.g., brushes, wheels and/or rollers) for propelling and cleaning along a surface of a pool or tank, from slipping on start-up or while commencing a turn along a surface of a pool or tank. In particular, the method includes (a) initiating rotation of the at least one pair of rotational support members from a first predetermined rotational speed within a first predetermined time period to propel the pool cleaner in a first direction over the surface; (b) maintaining at least the first rotational speed for a second predetermined time period; and (c) increasing the rotational speed of the at least one pair of rotational support members from the first predetermined rotational speed to a second predetermined rotational speed, such that the pool cleaner is propelled at a normalized rate for cleaning the pool.

In yet another embodiment, the method further includes the steps of receiving instructions to initiate a turn, halting propulsion of the pool cleaner, rotating at least one rotational support member of the at least one pair of rotational support members for a third predetermined time period to provide a predetermined angular change in direction of the pool cleaner, and repeating steps (a) through (c) described above.

Cleaning Pattern Embodiment

In a preferred embodiment, the pool cleaner moves from a sidewall to a position that is greater than one-half of the distance to the opposite wall of the pool, at which point it reverses and returns to the originating wall. As the pool cleaner advances in either a clockwise or counter-clockwise direction around the perimeter of the pool, the interior portions of the cleaning patterns overlap, thereby assuring additional cleaning of the central portion of the pool.

In particular, a self-propelled robotic pool cleaner comprises a pool cleaner housing having a first and second pair of dual rotational support members co-axially mounted at opposite ends of the housing for rotation on axles that are transverse to the direction of movement, the first pair of rotational support members being mounted on one side and the second pair of rotational support members mounted on the opposite side of the cleaner, wherein the pool cleaner is propelled by the rotation of the rotational support members. At least one reversible drive motor is operatively connected for synchronously driving the first pair of rotational support members.

The pool cleaner further includes a controller for controlling the direction of rotation of the at least one drive motor and thereby the directional movement of the pool cleaner. The controller includes memory and a processor for respectively storing and executing at least one executable cleaning pattern program to propel the pool cleaner in a generally straight path in a first direction, and a distance along the path that is greater than the midpoint between opposing walls of the pool.

In one embodiment, upon reaching the distance greater than the midpoint between the opposing walls, the controller causes the pool cleaner to stop and turn through a predetermined angular change in direction and resume moving in a second direction along a generally straight path that is angularly displaced from the first direction. In another embodiment, the controller causes the pool cleaner to be propelled along the sidewalls of the pool while traversing in at least one of the first and second directions.

In yet another embodiment, the pool cleaner is equipped with a switch that is mounted on or positioned proximate the interior surface of the housing. The switch is electrically coupled to the controller and upon being actuated, sends a signal to the controller, which causes an increase in the distance that the pool cleaner is propelled during its travel on the bottom surface between the opposing sidewalls. This can be accomplished by increasing the time, and therefore the distance before the drive-motor is stopped and reversed.

The manually-actuated switch can be a push button or rotatably actuated switch. Preferably, the manually-actuated switch is a reed switch that is actuated by a magnet mounted externally on the housing.

In one embodiment, the manually-actuated switch is adapted to enable the user to provide a series of activation signals that incrementally increase the time that, and accordingly the distance the pool cleaner is propelled past the midpoint between the opposing sidewalls. In one particular embodiment, the controller includes a counter for counting a first predefined time period that the pool cleaner is propelled in the first direction a distance greater than the midpoint between opposing sidewalls of the pool. Further, the switch can be adapted to enable a user to manually increase the first predefined time period incrementally by a second predefined time period, wherein the second predetermined time is incrementally added to the first predetermined time each time the switch is actuated by the end-user.

BRIEF DESCRIPTION OF THE DRAWINGS

The invention will be described in further detail below and with reference to the attached drawings in which:

FIG. 8 is a partial sectional view of a portion of the assembly shown in FIG. 6 at lines 8-8;

FIG. 9 is an exploded perspective view of the clutch assembly of FIG. 6;

FIG. 15 is a flow diagram of a method of controlling the rate of movement of the pool cleaner;

Figure 1:
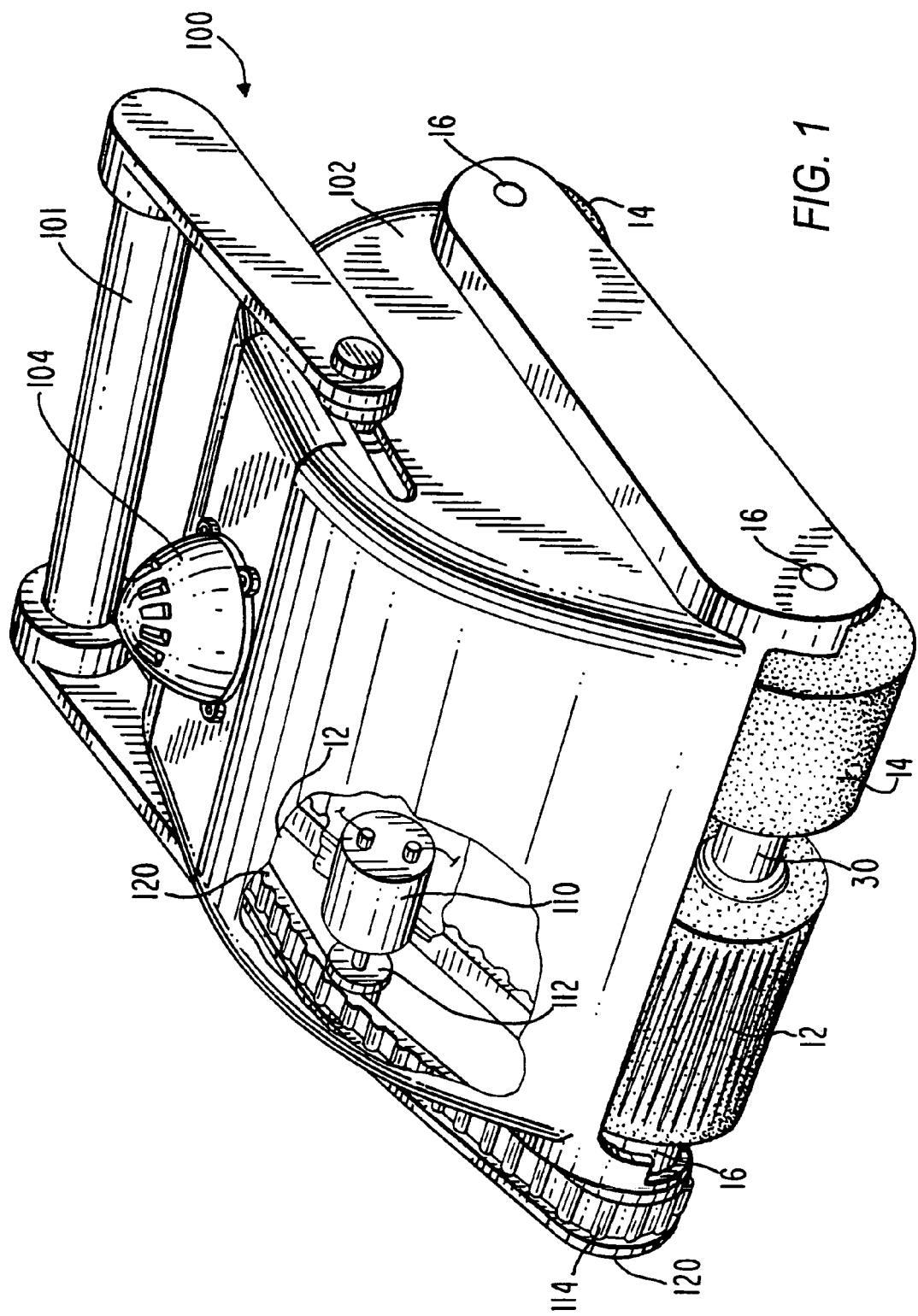
FIG. 1 is a top side perspective view with the housing partly cut away of a pool cleaner illustrating one embodiment of the invention.

To facilitate understanding of the invention, the same reference numerals have been used, when appropriate, to designate the same or similar elements that are common to the figures. Further, unless stated otherwise, the drawings shown and described in the figures are not drawn to scale, but are shown for illustrative purposes only.

DETAILED DESCRIPTION OF THE INVENTION

Referring now to FIG. 1, there is shown a pool cleaner 100 having a housing 130 with an outlet 134 in the upper portion of the housing for the discharge of water from the filter pump in order to urge the cleaner brushes into contact with the surfaces to be traversed. Handle 131 is provided near the top of the housing 130 for lifting and carrying the cleaner. At each end of the housing, a pair of brushes 12, 14 are co-axially mounted for rotation. A single drive motor 110 is shaft-mounted to drive pulley 112 that engages drive belt 114.

The outboard end of brush 12 is fitted with a drive pulley 120 on which the drive belt 114 is positioned. Henceforth, brush 12 will be referred to as a "driven brush".

The adjacent brush 14 is mounted on common axle 16, is separate from driven brush 12 and is freely rotatable, within limits that will be described in more detail below. Henceforth, brush 14 will be referred to as a "free brush" in describing the apparatus and method of the invention.

To further facilitate the description and understanding of the invention, driven brush 12 is shown shaded in the figures to differentiate it from free brush 14.

With continuing reference to the embodiment illustrated in FIG. 1, a delay clutch means 30 is positioned between brushes 12 and 14 and co-axially mounted on axle 16.

Figure 2:
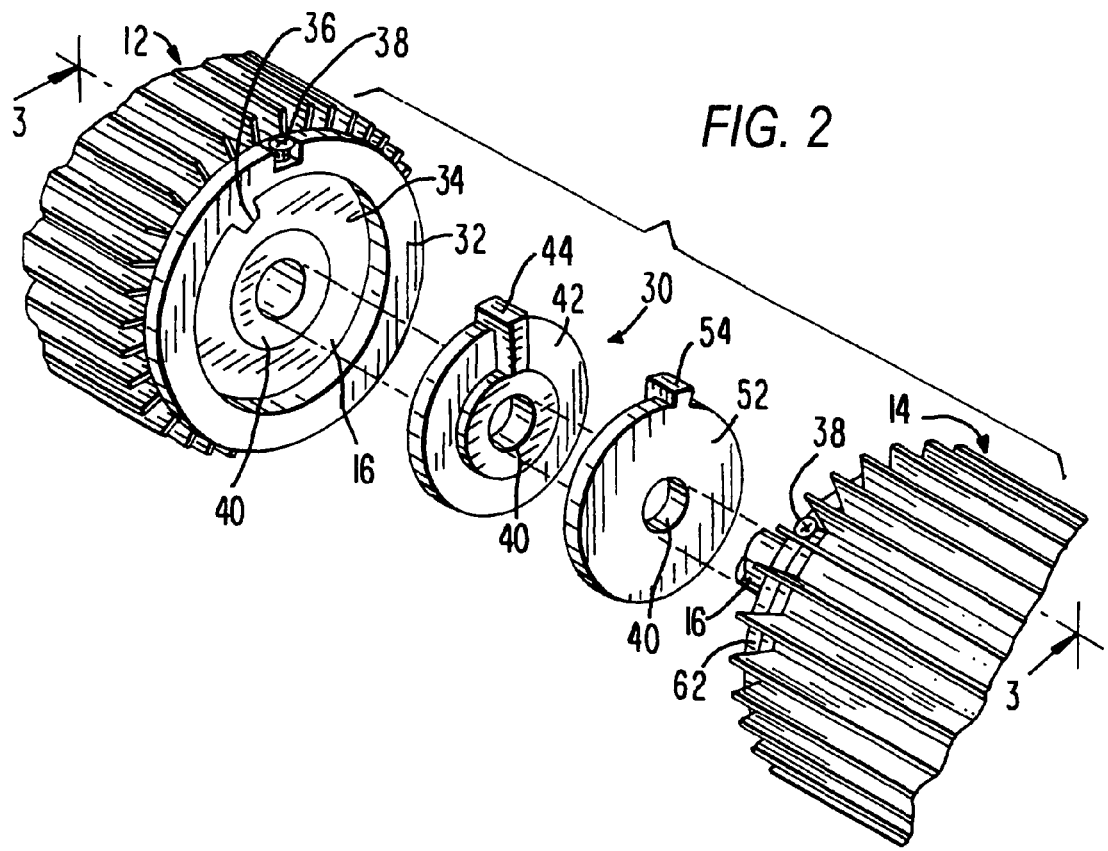
FIG. 2 is an exploded view of one embodiment of a rotational delay clutch mechanism for use in the invention.

Referring now to FIG. 2, driven clutch plate 32 with axial opening 40 is securely mounted to the interior or in-board end of driven brush 12. In the embodiment illustrated, the driven clutch plate 32 has an annular recess 34 into which projects engagement member 36. A set screw 38 is also provided for further adjustment as will be explained below. Opposing clutch plate 62 is securely affixed to the inboard end of free brush 14 and its interior face is configured similarly to plate 32.

Figure 3:
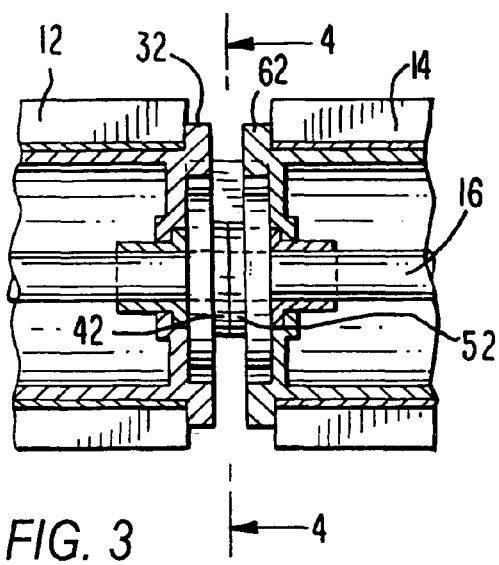
FIG. 3 is a cross-sectional view of the clutch assembly of FIG. 2 at line 3-3.

As further illustrated in this embodiment, a pair of intermediate clutch members 42 and 52 having projecting engagement members 44 and 54, respectively, is mounted between plates 32 and 62. When the driven clutch plate 32 has proceeded through a sufficient number of revolutions, the projecting members 36, and the engagement members 44, 54 are all in contact and the free brush moves synchronously. Upon reversal of the drive motor and driven brush 12, the free brush 14 remains motionless until the intermediate clutch members have rotated sufficiently to bring the engagement members back into contact with the projecting members. In this embodiment, the driven wheel will turn almost three complete revolutions before the free brush begins to move synchronously Referring now to FIG. 3, there is shown a cross-sectional view depicting the mating arrangement of the fixed clutch plates and rotating intermediate clutch members 42 and 52. As clearly shown, all of the elements are mounted for rotation on axle 16.

Figure 4:
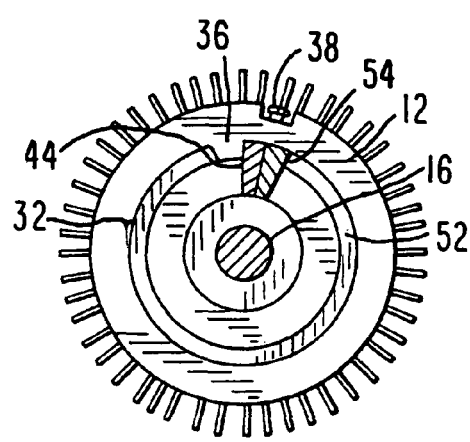
FIG. 4 is a cross-sectional view of the embodiment of FIG. 3 at line 4-4.

The cross-sectional view of FIG. 4 shows the relationship of the projecting member 36 on clutch plate 32 in contact with engagement members 44 and 54. It can also be seen from this cross-sectional view that set screw 38 in the periphery of plate 32 can be lowered to secure intermediate clutch member 42 in position against projecting member 36.

Figure 5:
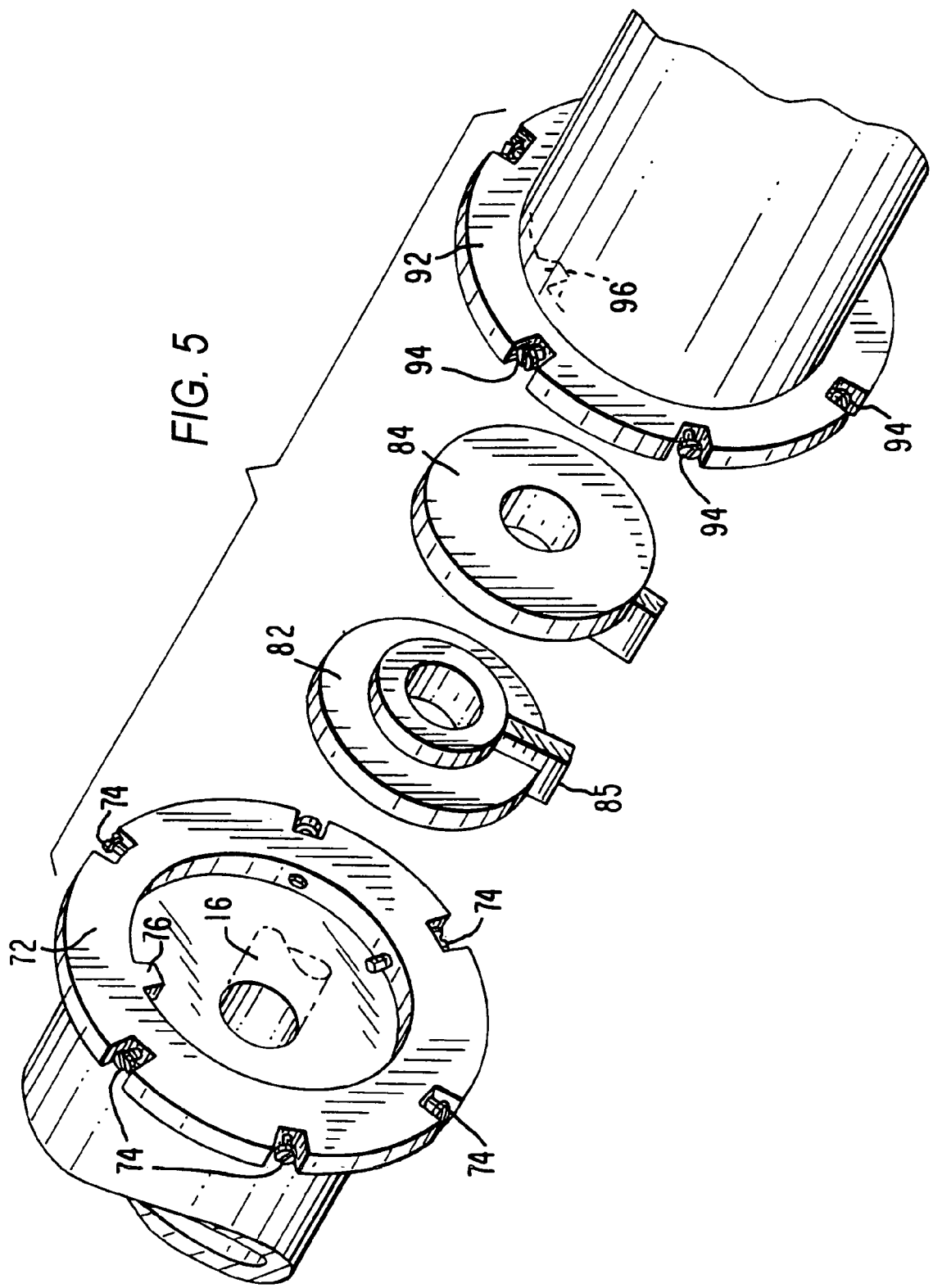
FIG. 5 is an exploded perspective view of another embodiment of a rotational delay clutch assembly.
Figure 6:
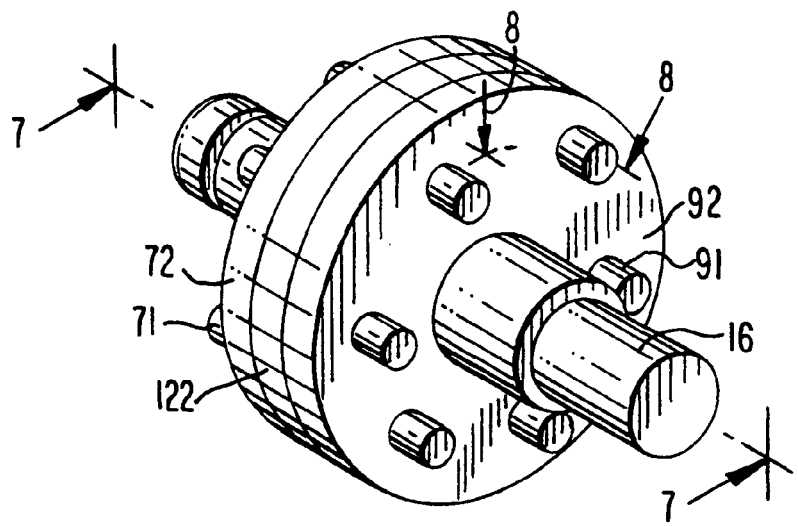
FIG. 6 is a perspective view of a further embodiment of a rotational clutch assembly.
Figure 7:
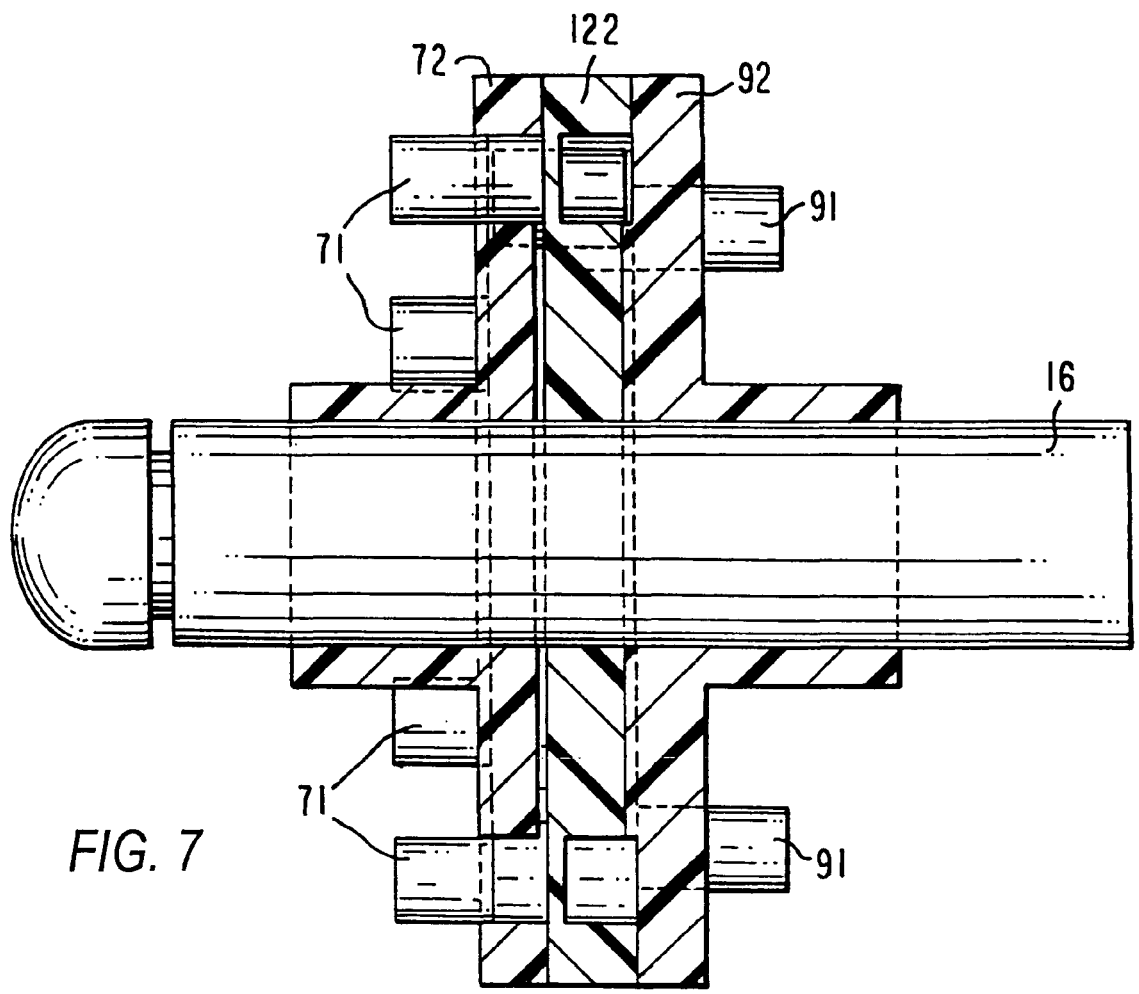
FIG. 7 is a cross-sectional view of the clutch assembly of FIG. 6 at line 7-7.

An alternative preferred embodiment of an adjustable delayed drive clutch plate assembly is schematically illustrated in the exploded view of FIG. 5. In the embodiment illustrated, the opposing clutch plates 72 and 92 are provided with a plurality of moveable adjustable projecting members 74 and 94, respectively. The intermediate clutch members 82 and 84 are provided with engagement members 83 and 85, respectively, which are positioned to engage radially projecting contact members 76 and 96. As in the embodiment described above, the clutch assembly is co-axially mounted on axle 16 which is also supporting brushes 12 and 14.

This embodiment of the delay drive clutch assembly permits adjustment to be made to the number of independent rotations by the driven brush before engagement and synchronous operation of the free brush simply by moving one or more of the projecting members 74, 94 on either or both of the end clutch plates 72, 92 radially inward into the central space to contact the engagement members 83 and/or 85 in less than a full revolution. As previously explained, this type of adjustability can be utilized to specifically adapt the number of degrees, or arc that the pool cleaner turns when the drive motor reverses direction.

As will be understood by one of ordinary skill in the art, other structures and configurations can be employed to adjust the number of rotations, or partial rotations. For example, sliding engagement pins (not shown) can be mounted in one or both or the end clutch plates 72, 92 for movement in the axial direction to contact fixed engagement members 83, 85.

A further embodiment is illustrated in FIGS. 6 through 9 where like elements are referred to by numerals as previously described. An intermediate plate 122 is also mounted on axle 16 between end drive plate 72 and end driven plate 92. In this construction, the end plates are provided with a plurality of pins 71 and 91, respectively, and intermediate plate 122 is provided with at least one pin 121 that extends through the plate to be engaged by pins 71 and 91. As will be understood from the description of the functioning of the set screws 74 and 94 of FIG. 5, advancing the pins toward plate 122 advancing the pins toward plate 122 controls the rotational movement between the driving and driven plates 72 and 92 respectively. The number and placement of pins 71 and 91 and their passages through the plates is determined with reference to the variables previously described and the desired degrees of the directional changes to be made by the pool cleaner. The embodiment of FIGS. 6-9 thus allows the user of the pool cleaner to adjust position of the pins to adapt the movement to the requirements of the pool to be cleaned.

Figure 10:
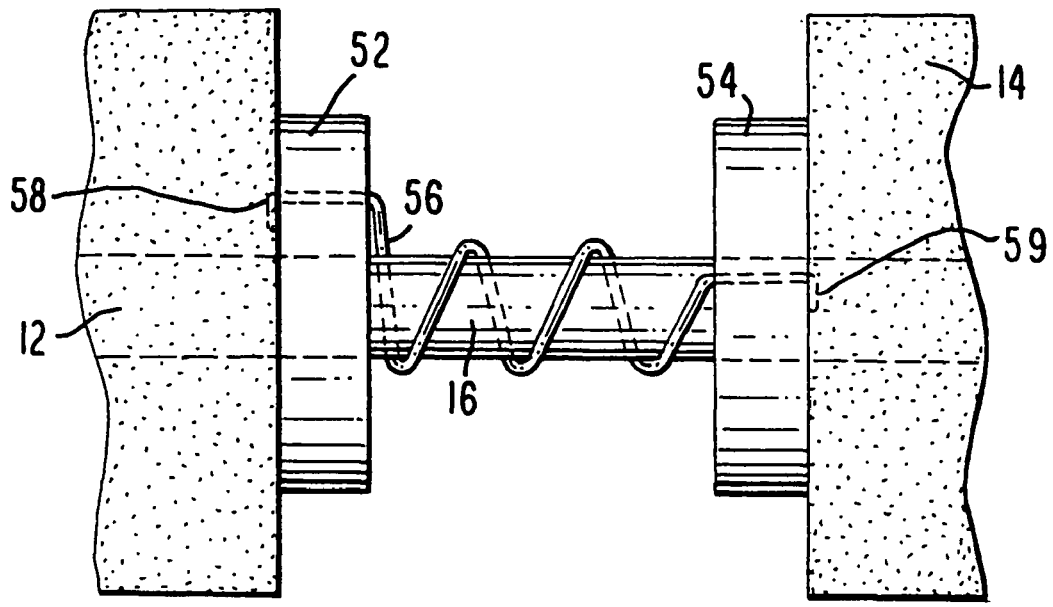
FIG. 10 is a top view, partly in section, of another embodiment of a rotational delay clutch assembly for use with the invention.

Referring to FIG. 10, there is schematically illustrated a delayed drive mechanism employing a flexible wire 56 extending between plates 52 and 54 that are attached respectively to driven brush assembly 12 and free brush assembly 14. In accordance with this embodiment, movement of the driven brush 12 and associated plate 52 will result in wire 56 being spirally wound around axle 16 on which free brush assembly 14 is supported for free rotation after the driven brush 12 has completed a sufficient angular movement.

Figure 11:
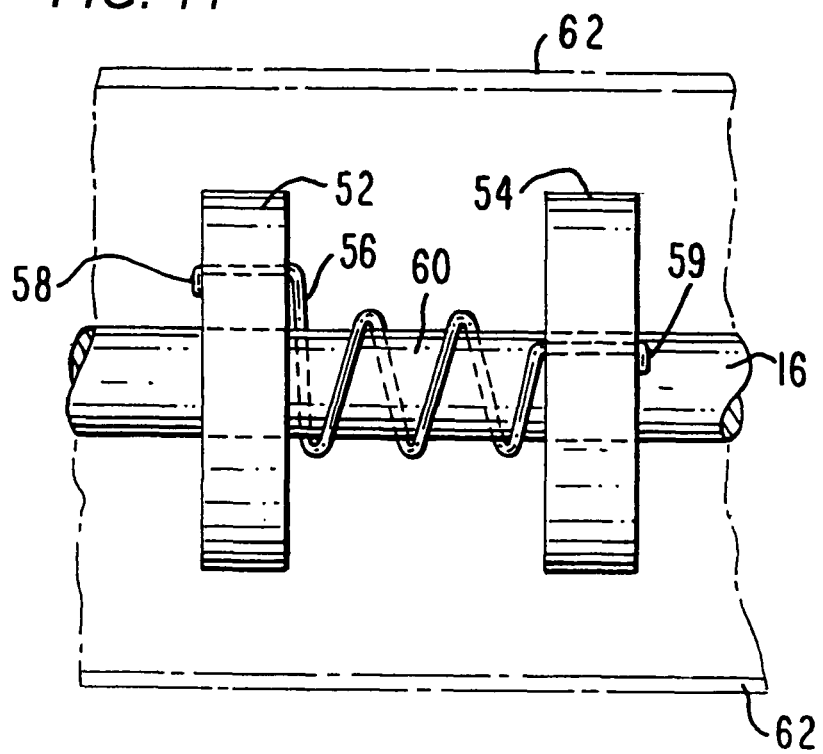
FIG. 11 is a view of a modified embodiment similar to that of FIG. 11.

As shown in FIG. 11, the axle 16 can be provided with a housing 60 of a larger diameter that will require fewer wraps of wire 56 in order to remove all slack and cause free brush 14 to move synchronously with brush 12. The change in the location of the points of attachment 58 and 59 of the opposing ends of wire 56 will also serve to change the number of revolutions or angular displacement experienced by the plate 54 and associated free brush when the slack in the wire is being taken up. It will also be understood that the number of turns required to unwrap the wire from either axle 16 or spool 60 of FIG. 11 will be one-half of the total number of revolutions required before free brush 14 begins to move synchronously with driven brush 12.

It will also be understood from the schematic illustrations of FIGS. 10, and 11 that the plates 52, 54 can be positioned relatively much closer together and that they can be assembled in a protective housing 62, shown in phantom. Alternatively, the plates 52 and 54 can be provided with an annular opening or with a rim so that they are mounted in very close proximity to enclose the wire. Reversing the direction of the drive motor causes the wire to unwind and then wind around the spool or axle 60, thereby turning the pool cleaner at each occasion that the direction is reversed.

Figure 12:
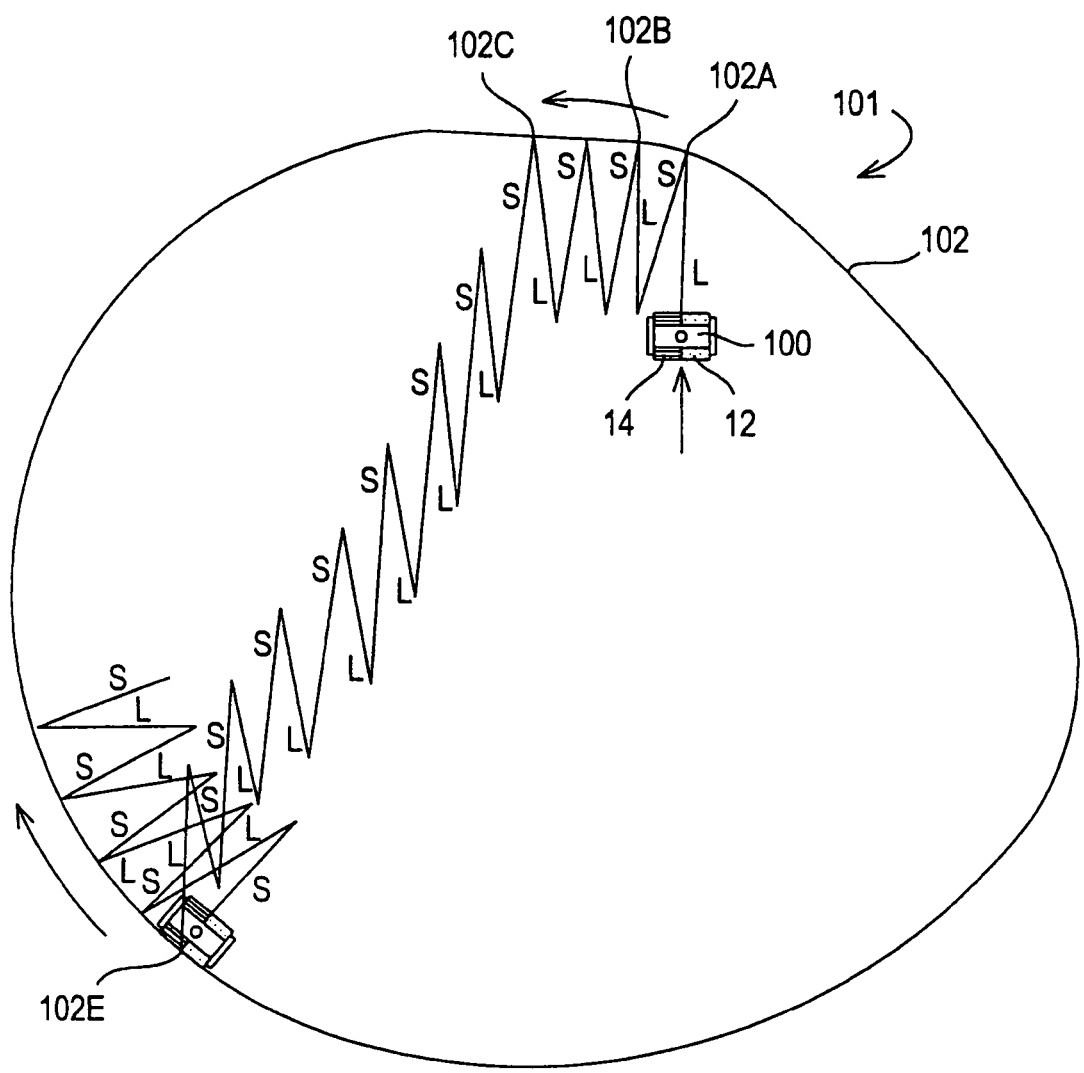
FIG. 12 is a schematic illustration of the movement of a pool cleaner in generally round pool in accordance with method of the invention.

Referring now to FIG. 12, there is schematically illustrated a controlled pattern of movement of a pool cleaner 100 operating in a large, generally circular tank or pool 101, having a perimeter 102. The pool cleaner 100 has fore and aft driven brushes 12 and co-axially mounted free brushes 14. In the mode of operation illustrated, the pool cleaner 100 approaches and contacts the side wall at a first position 102A; the direction of rotation of the drive motor and thereby, driven brushes are reversed and operate for a number of rotations sufficiently to turn the cleaner at an angle in the range of from 15° to 60° and then with synchronous operation of the free brushes 14, to move along a shorter leg (S), after which the unit stops and reverses direction to move along a longer leg (L) to the second position 102B at the periphery of the pool 100.

This pattern of movement continues along alternating long and short legs (L, S) until the predetermined number of cycles have been completed at contact point 102C. Thereafter, the order of the movement along the long and short legs is reversed which causes the cleaner 10 to move in towards the center of the pool 100 so that the pool cleaner does not return to contact the side wall from which it departed. As will be seen from the schematic illustration of FIG. 12, the pool cleaner continues in accordance with the programmed directional control until it reaches a position 102E on the opposite side wall. As the program is reversed, the pattern of movement of the pool cleaner 100 with respect to the periphery 102 of pool 101 changes from counter-clockwise to clockwise.

Figure 13A:
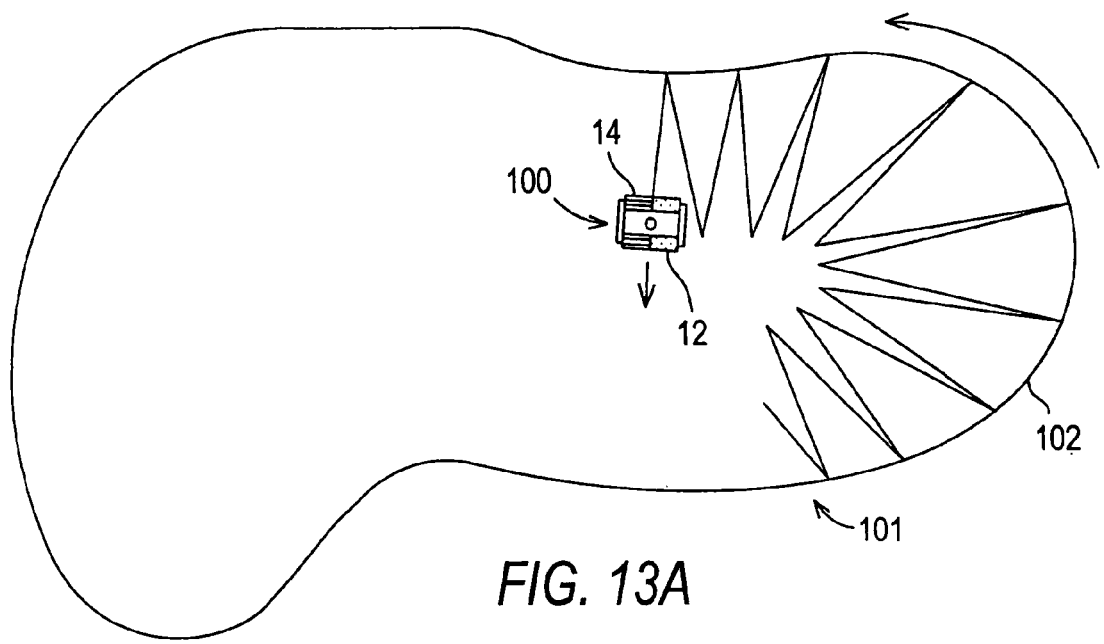
FIGS. 13A and 13B are schematic illustrations of the movement of a pool cleaner in an irregular shaped pool in accordance with one method of the invention.
Figure 13B:
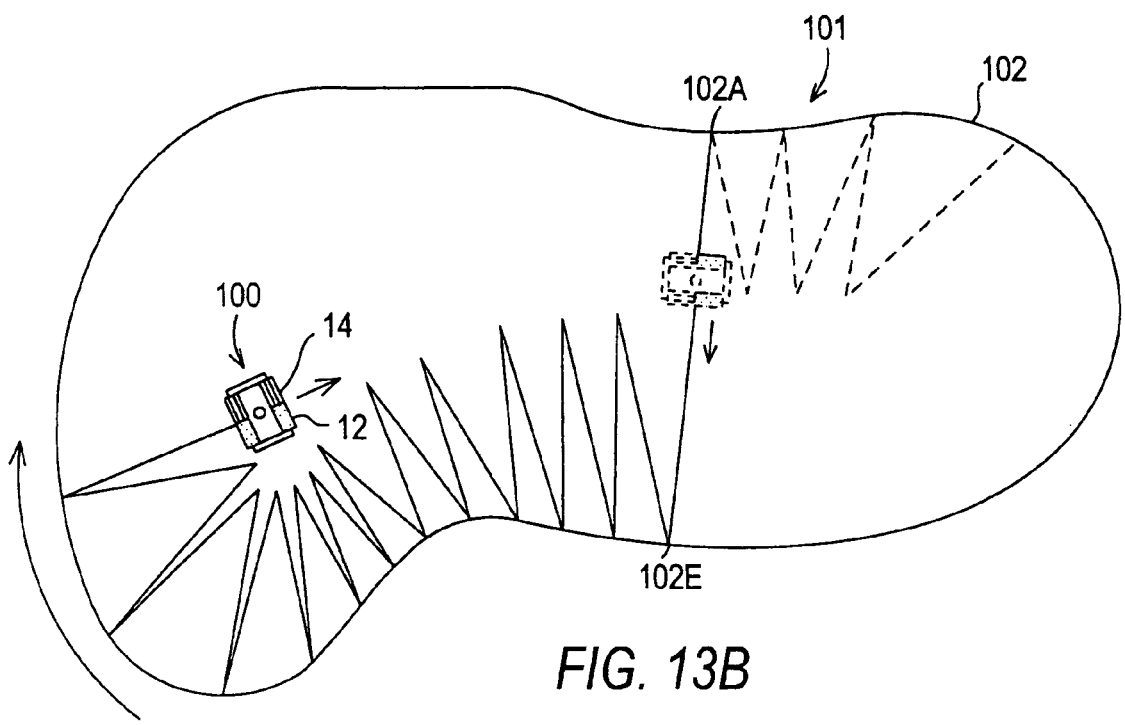

Referring now to FIG. 13, there is schematically illustrated the controlled directional movement of a pool cleaner 100 in accordance with one preferred method of operation of the invention. The pool cleaner 100 initially moves up to and away from the side wall of the irregularly shaped pool 101 for a pre-determined number of cycles. In accordance with the illustration of FIG. 13, at the end of the first number of cycles at point 102A on the side of the pool, an extra long leg L' permits the pool cleaner to cross the entire bottom surface of the pool and ascend the opposite wall at 102E. Thereafter, the pool cleaner resumes its programmed cleaning operation to run the predetermined long and short legs, but during this cycle moving in a clockwise direction.

Figure 14A:
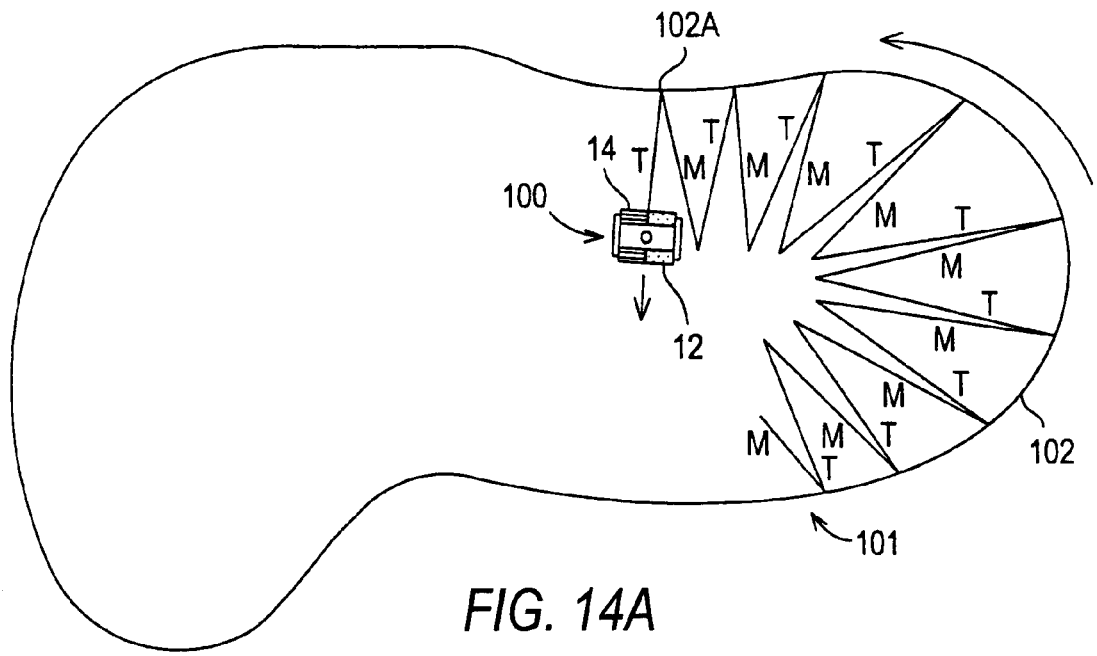
FIGS. 14A and 14B are schematic illustrations similar to FIGS. 13A and 13B of a further embodiment of the method of the invention.
Figure 14B:
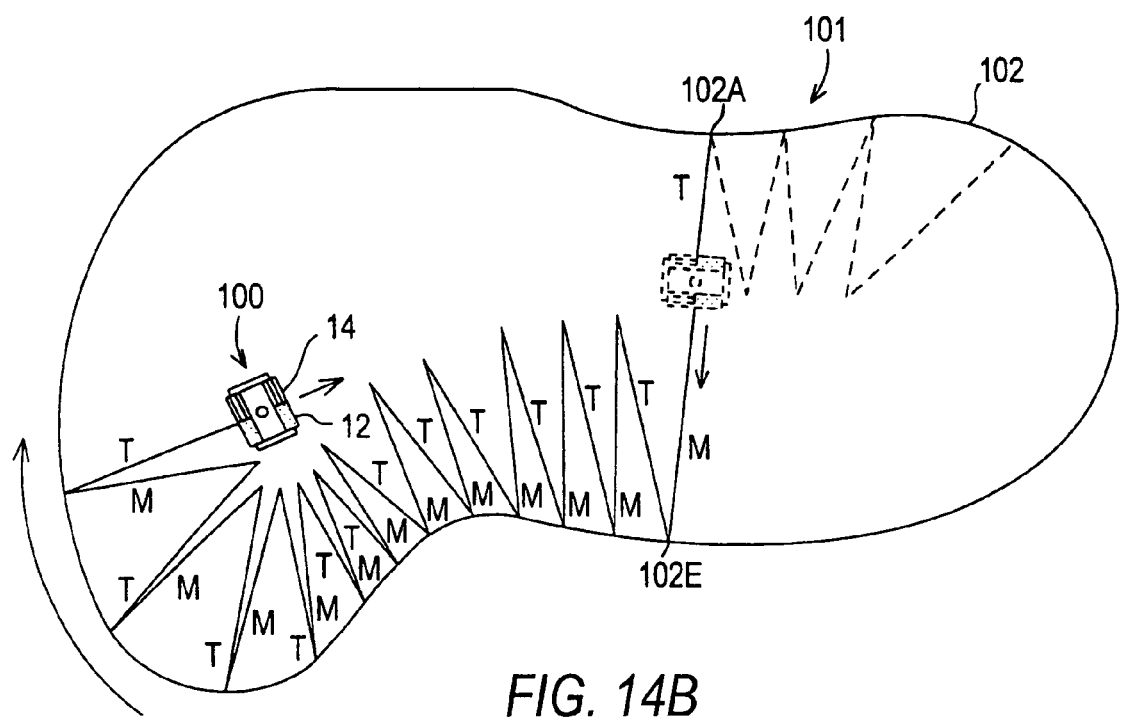

A further mode of operation will be described with reference to FIGS. 14A and 14B where there is schematically illustrated controlled directional movement of pool cleaner 100 that is equipped with a mercury switch that generates a signal when the orientation of the pool cleaner body moves from horizontal to a pre-determined angle of about 70°. As the pool cleaner 100 moves up on the wall the mercury switch signal is received by the processor and a time clock provides a delay of, e.g., eight seconds before the drive motor is stopped and reversed. The processor timer then allows the pool cleaner to go past the middle of the pool before it reverses the direction of the drive motor. Thus, the pool cleaner is running on a program which is based on alternating mercury switch and time control. The long leg (M) is controlled by a mercury switch, while the short leg (T) is controlled by a timer.

This cycle is repeated a predetermined number of times after which as the pool cleaner descends the wall and goes past the middle of the pool, it does not reverse when time control changes to mercury switch control, but continues to move across the pool and resumes its program, but moving in a clockwise direction.

From the above description, it will be seen that the method and apparatus of the invention of controlling the movement of the pool cleaner is accomplished without resorting to a complicated algorithm embedded in the processor that must be executed by the controller. The relative simplicity of the means for controlling the movement of the cleaner permits the apparatus to be adjusted for the particular conditions of the tank of pool to be cleaned.

In any of the embodiments of FIGS. 1-14, once the pool cleaner 100 stops at a wall or initiates a turn along the bottom surface of the pool, it is desirable to increase the rotation of the driven brush 12 in a controlled manner to avoid slippage of the driven brush 12 (and free brush 14) along the surface of the pool. That is, if the rotational speed of the driven brush 12 is rapidly increased from either a halted state or while operating at a low rotational rate, the surface contact areas of the driven brush and subsequently the free brush 14, are susceptible to slippage along the pool surface in an uncontrolled manner, which can result in excessive wear or damage to the drive-motor 110, the belt and/or brushes, among other pool cleaner components. Moreover, slippage of the driven brush 12 and/or free brush 14 causes the pool cleaner 100 to fail to properly complete the turn and results in a deviation from the pre-programmed pool cleaning pattern, thereby decreasing the cleaning coverage and efficiency of the pool cleaner.

FIG. 15 depicts a flow diagram of a method 1500 of controlling the rate of movement of the pool cleaner 100. The method 1500 starts at 1501, where the pool cleaner is either beginning its pool cleaning operation by moving forward or making a turn while performing a pool cleaning operation along the bottom surface of the pool. In either case, the pool cleaner is halted or in a paused state of operation.

At step 1502, the controller (e.g., controller 160 of FIG. 17) sends a signal to the drive-motor 110 to increase the rate of rotation from zero rpm to a first predetermined rotational rate for a first predetermined period. The driven brush rotates at the first predetermined rotational rate along the surface of the pool and the free brush 12 also rotates at the first predetermined rate once the clutch engages in a manner as described above with respect to FIGS. 1-11.

At step 1504, the controller 160 maintains the rotational rate of the driven brush 12 (and the free brush 14) at the first predetermined rotational rate for a second predetermined period or for a time determined by the controller that is sufficient to complete a turn. The method then proceeds to step 1506.

At step 1506, the rotational rate of the driven brush 12 and free brush 14 are increased to a second predetermined rotational rate, which is greater than the first predetermined rotational rate. The pool cleaner 100 is thereby propelled along its current path of the programmed cleaning pattern at a velocity associated with the brushes 12 and 14 rotating at the second predetermined rotational rate.

At step 1508, if the controller 160 changes the direction of the pool cleaner 100, either because a pool wall has been encountered or a timer associated with the amount of time the cleaner 100 traverses along a path has expired, the pool cleaner drive motor is stopped in preparation for initiating another turn. The method 1500 then proceeds with step 1502 as described above. Otherwise, if the pool cleaner 100 has completed its pool cleaning task in accordance with its program, then in one embodiment the cleaning pattern is repeated. Alternatively, the controller 160 initiates a shutdown process to halt operation of the cleaner 100, and the method 1500 ends.

The operation of the pool cleaner with regard to method 1500 is dependent on the size (e.g., diameter) of the driven and free brushes 12 and 14, the diameter of the sprockets and pulleys that interact between the brushes and drive motor 110, among other variables well known to those of ordinary skill in the art. For a pool cleaner 100 having brushes illustratively with an outer diameter of approximately three inches, at step 1502, power is provided to the drive motor 110 such that the driven brush 12 (and subsequently the free brush 14) preferably rotates from a halted state (i.e., zero rpm) to approximately twenty-five (25) rpm in a first time period of approximately 0.5 seconds.

Thereafter, at step 1504, the brushes continue to rotate at 25 rpm for a second time period of approximately five (5) seconds or for a time that is sufficient to complete a turn. At step 1506, the rotational rate of the brushes is increased to a normalized (e.g., maximum) operating rate of approximately eighty (80) rpm, such that the pool cleaner is propelled at a velocity that is suitable for efficiently cleaning the surface of the pool.

The rotational rates and time periods described herein are provided for illustrative purposes only, and one of ordinary skill in the art will appreciate that other rotational rates of the brushes, as well as time periods associated with rotating the brushes at particular rates can be implemented based on the design configuration of the pool cleaner, as well as the composition and texture of the pool surface (e.g., tile, gunnite or plastic liner). In this manner, during each instance when the pool cleaner 100 either begins movement or initiates a turn from a halted state, method 1500 is employed to provide sufficient contact (i.e., frictional forces) between the brushes and the surface of the pool to prevent slippage. Thus, method 1500 advantageously increases the longevity of the pool cleaner, as well as assists in propelling the pool cleaner along the surface of the pool in accordance with the programmed cleaning pattern.

Figure 16:
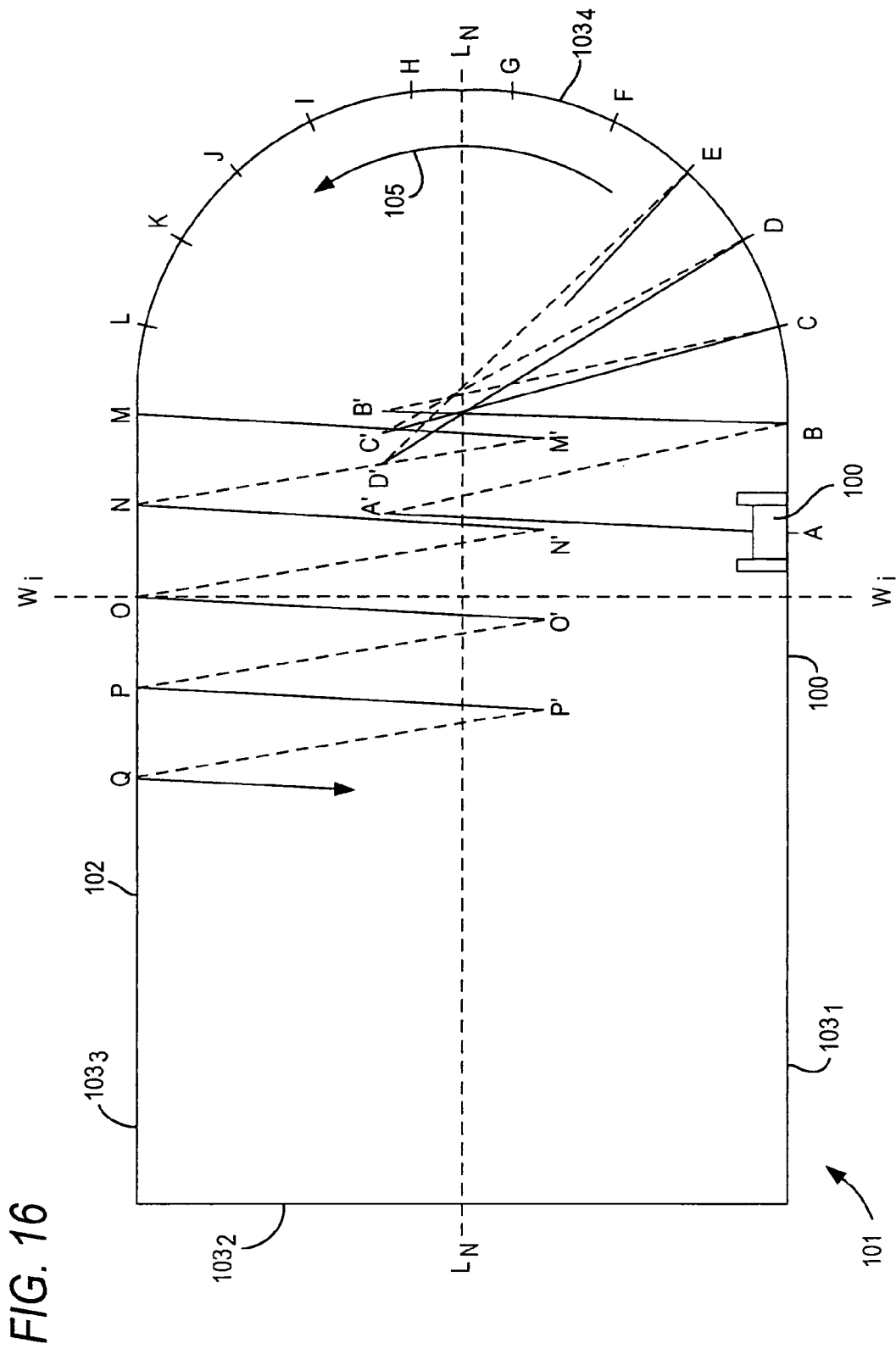
FIG. 16 is a schematic illustration of the movement of a pool cleaner in accordance with another method of the invention.

Referring now to FIG. 16, there is schematically illustrated an embodiment of another controlled pattern of movement of a pool cleaner 100 operating in a large tank or pool 101. The pool 101 includes a perimeter 102 that is illustratively rectangular with an end that is curved (e.g., semi-circular in shape). A central longitudinal axis is illustratively shown by the axial line Ln-Ln, while the axial line Wi-Wi represents the central axis that traverses axial line Ln-Ln along the width of the pool 101.

Preferably, the pool cleaner 100 has fore and aft driven brushes 12 and co-axially mounted free brushes 14 as described above, although other embodiments of the pool cleaner can implement the cleaning pattern of FIG. 16. In one illustrative cleaning mode of operation, the pool cleaner 100 cleans as it is propelled along a generally straight path starting at a sidewall (e.g., sidewalls $103_1$-$103_4$) to a position that is greater than one-half of the distance to the opposing sidewall of the pool. Once the pool cleaner reaches a point along the pool surface that is greater than midway between the opposing side walls, the pool cleaner stops, turns angularly to a direction that is different from the previous direction, and traverses back (reverses direction) to the sidewall from which it originated.

For example, the pool cleaner 100 illustratively starts its cleaning operation along sidewall $103_1$ at Point A, and traverses perpendicularly from sidewall $103_1$ a distance past the midpoint between sidewalls $103_1$ and $103_3$ (i.e., longitudinal axis L) to Point A'. The pool cleaner 100 illustratively turns counter-clockwise at an angle in the range of 10° to 60°, and is then propelled in the reverse direction back towards the sidewall $103_1$ to Point B. At Point B, the pool cleaner 100 turns clockwise to align itself perpendicular to the sidewall $103_1$ and again proceeds past the mid-point between the opposing sidewalls $103_1$ and $103_3$ to Point B'. At Point B', the pool cleaner again turns and reverses direction to proceed to Point C, which is, illustratively, located along curved sidewall $103_4$. The cleaner 100 continues the pattern of movement around curved sidewall $103_4$, as illustratively shown by arrow 105 and Points E through Q and continues to clean along sidewall $103_3$ and $103_2$ in a similar manner.

Each time the pool cleaner 100 moves in a forward direction away from a sidewall 103, it traverses along the surface of the pool a distance that is greater than the mid-point between the originating sidewall and the opposing sidewall. Preferably, the turning angle is programmed such that adjacent cleaning paths overlap to thereby ensure that the bottom central portion of the pool surface, as well as the periphery surface portions proximate the sidewalls 103 of the pool surface are properly cleaned.

One of ordinary skill in the art will appreciate that the pool cleaner 100 can be programmed to perform the cleaning operation in either a clockwise or counter-clockwise manner. Although not shown, one of ordinary skill in the art will also appreciate that the pool cleaning pattern of FIG. 16 is also applicable while cleaning the sidewall surfaces 103 of the pool 101. In one embodiment, the pool cleaner can be programmed to treat the vertical sidewalls and the bottom surface as a contiguous pool surface, such that the horizontal or vertical orientation of the pool cleaner is ignored for purposes of performing the pool cleaning pattern of FIG. 16. Accordingly, the upper or top portions of opposing sidewalls proximate the top surface of the water are considered the starting and ending points of a cleaning path, and the same cleaning pattern shown in FIG. 16 is performed.

In another embodiment, the cleaning pattern of FIG. 16 can be applied separately, for example, to the substantially horizontal bottom surface of the pool and each of the substantially vertical sidewalls. In this embodiment, the upper and lower portions of each sidewall surface is treated as an opposing sidewall, in a similar manner as the sidewalls are treated with respect to the bottom surface of the pool.

Figure 17:
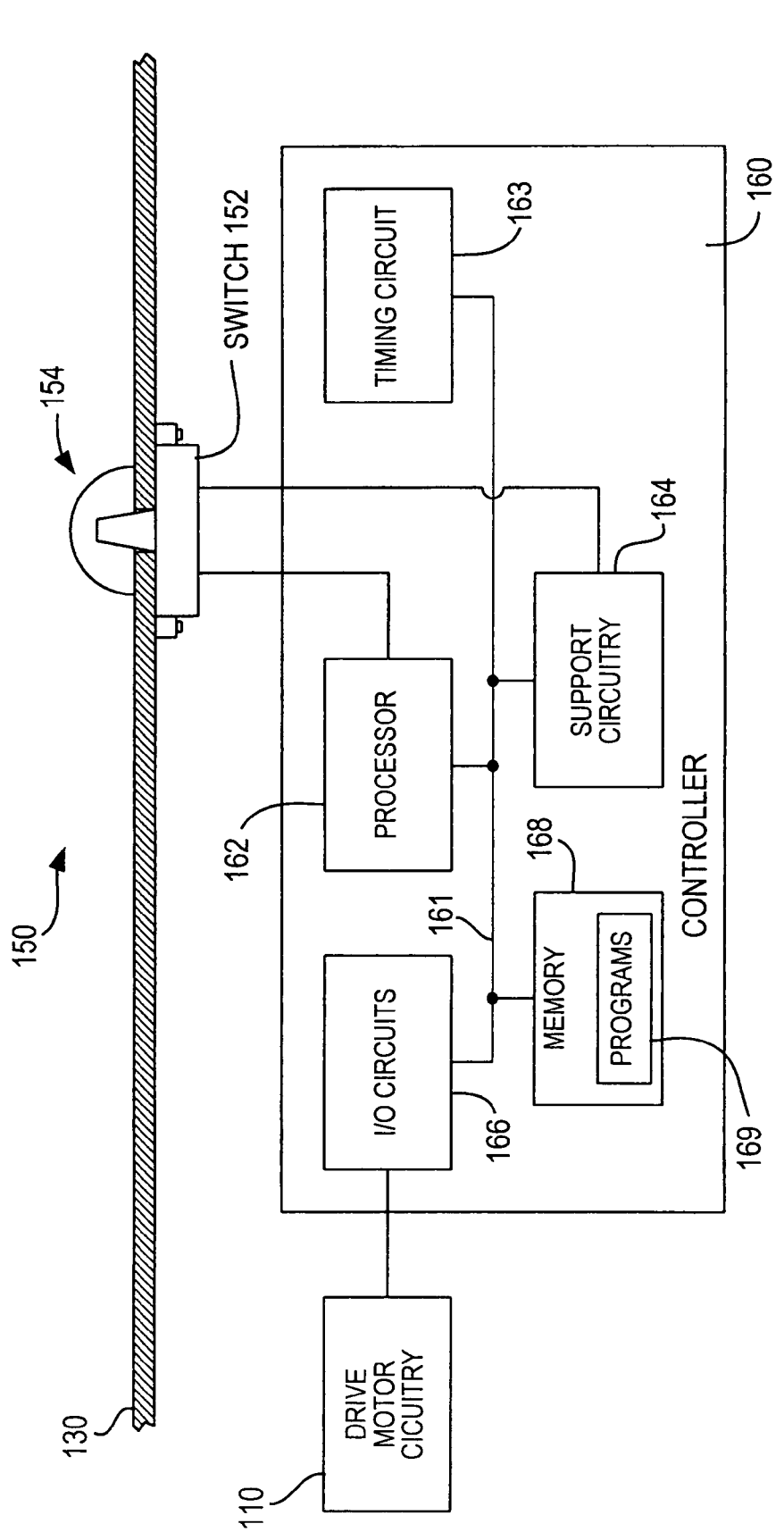
FIG. 17 is a schematic diagram of a first embodiment of a controller with a switch for manually controlling the movement of the pool cleaner in accordance with the principles of FIG. 16.
Figure 18:
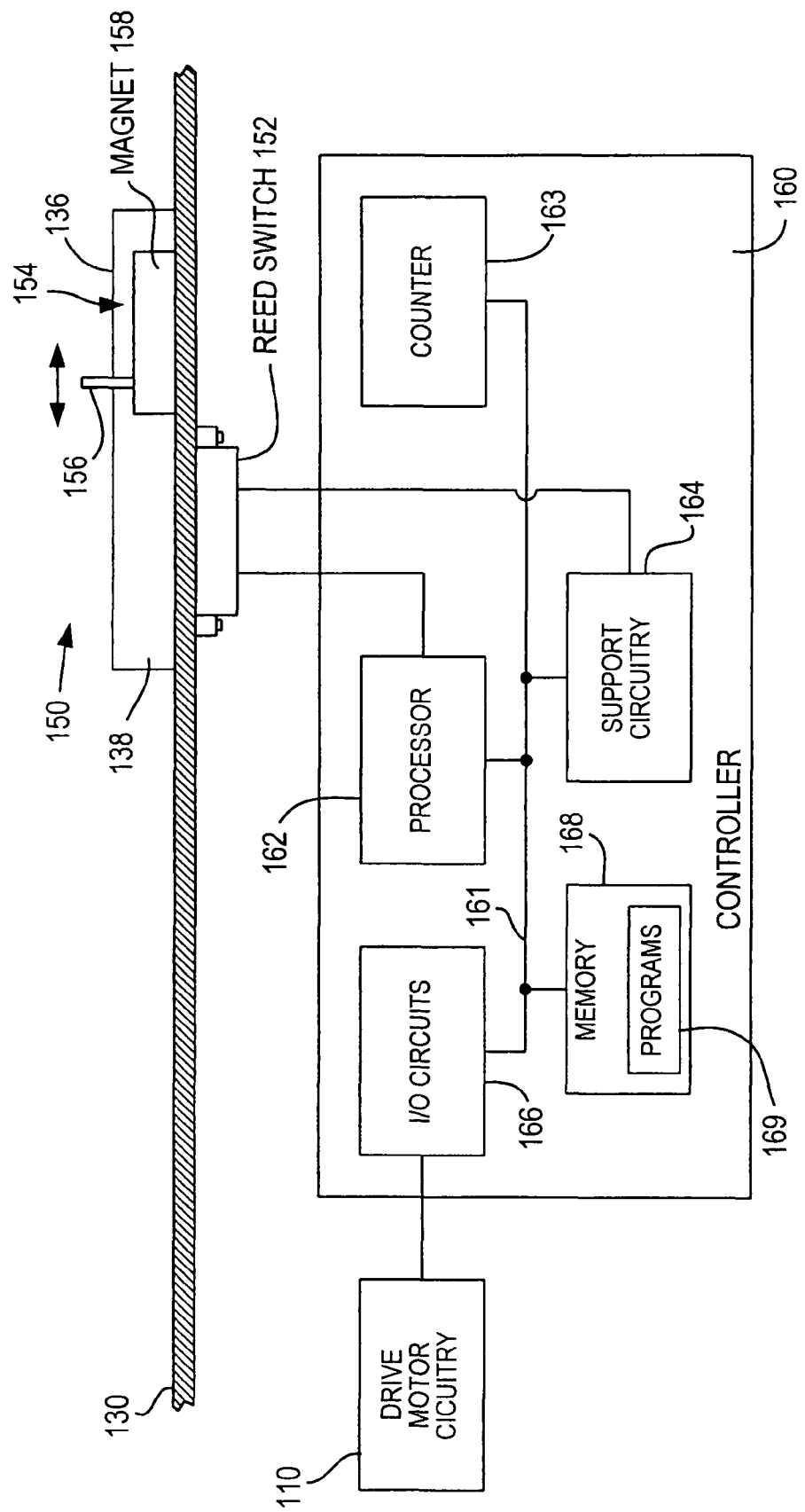
FIG. 18 is a schematic diagram of a second embodiment of the controller with a switch for manually controlling the movement of the pool cleaner in accordance with the principles of FIG. 16.

For the purpose of describing the invention, the pool cleaning pattern of FIG. 16 is shown with respect to a pool with a semi-circular portion joined to a conventional rectangular shaped pool. However, due to irregularities in the size and/or shape of custom-built pools, it has been found to be desirable to enable the end-user of the pool cleaner 100 to adjust the distance the pool cleaner travels before turning and reversing direction. FIGS. 17 and 18 illustrate alternate embodiments for controlling the distance that the pool cleaner traverses in a direction away from a sidewall, before turning and reversing direction.

Referring to FIG. 17, a schematic diagram of a first embodiment of a controller 160 and a switch 150 for manually controlling the distance the pool cleaner 100 is propelled between opposing sidewalls 103 is shown. The controller 160 and switch 150 operate in accordance with the principles of the cleaning pattern shown in FIG. 16.

The controller 160 is installed in the watertight container mounted on the interior of the chassis 130. The switch 150 is electrically connected to the controller 160 and enables an end-user to manually change specific program settings which are associated with the distance that the pool cleaner is propelled before it stops to turn and reverse direction, as described above with respect to the cleaning pattern of FIG. 16.

The controller 160 comprises a processor 162 and memory 128 for storing various control programs 129. The processor 162 may be any conventional processor, such as one or more INTEL processors or a conventional micro-controller. The memory 128 can include volatile memory (e.g., RAM), non-volatile memory (e.g., ROM, programmable read-only memory) and/or a combination thereof. The processor 162 cooperates with support circuitry 164, such as power supplies, cache memory, clock, counters and/or timing circuits 123, among other conventional support circuitry, to assist in executing software routines (e.g., method 1500 among other programs) that are stored in the memory 128. The various controller components communicate with each other via one or more bus lines 161 in a well known manner. It is noted that an operating system (not shown) and, optionally, various application programs (not shown) can be stored in the memory 128 to run specific tasks and enable user interaction, e.g., the programming of various control parameters.

The controller 160 can optionally include input/output (I/O) circuitry 166 that forms an interface between various functional or electrical components communicating with the controller 160. For example, as shown in FIG. 17, the illustrative controller 160 communicates with components such as the drive motor 110 and the switch 150, among other functional components or circuits.

Although the controller 160 of FIG. 17 is depicted as a general-purpose computer that is programmed to perform various control functions in accordance with the present invention, the invention can be implemented in hardware such as, for example, an application specific integrated circuit (ASIC). As such, it is intended that the processes described herein be broadly interpreted as being equivalently performed by software, hardware, or a combination thereof.

The switch 150 is preferably mounted to the chassis 130 of the pool cleaner 100 at a location suitable for ease of access, to thereby enable the end-user to control the distance the pool cleaner 100 traverses in a forward direction before reversing direction, illustratively, between opposing sidewalls of the pool. The end-user can operate the switch 150 to increase the program settings of the controller 160 to enable the pool cleaner 100 to traverse a distance past the mid-point between opposing side walls of a non-conventional, irregularly shaped and/or sized pool. Such non-conventional shaped/size pools can include those that are not substantially rectangular, circular, oval or kidney shaped pools, among other common shaped pools.

Referring to the example above with respect to FIG. 16, the user can change the timer or counter settings to a time value greater than the factory/dealer settings (e.g., 12 seconds) based on the dimensions of the end-user's pool 101. One of ordinary skill in the art will appreciate that the factory or dealer will have programmed the time values to commensurate with the shortest distance between opposing side walls of the pool. Thus, the end user is able to increase the time parameters of the program to increase cleaning coverage between opposing side walls, such that the pool cleaner traverses and cleans in a forward direction a distance beyond the factory or dealer provided programming settings.

The switch 150 includes a switching mechanism 152 that is controlled by an actuator 154. The switching mechanism (electronic control portion) is preferably mounted proximate the inner surface of the housing in the watertight interior container. The actuator 154 is positioned on the outer surface of the chassis shell 130 proximate the switching mechanism to enable the user to operate the switch 150.

As shown in FIG. 17, the switch can be a push-button switch with a protective seal that encases the actuator 154 to maintain a watertight environment between the actuator 152 and outer surface of the chassis 130. Alternatively, the switch actuator 152 can be a rotatable switch having an O-ring or other seal formed between the actuator 152 and switching mechanism 152 to maintain the watertight environment within the interior of the chassis 130.

Referring to FIG. 18, a schematic diagram is shown of a second embodiment of a switch for manually controlling the movement of the pool cleaner in accordance with the principles of FIG. 16. FIG. 18 is the same as FIG. 17, except that the switch 150 is preferably implemented as a reed switch 152 that is actuated by utilizing a magnet 154.

The reed switch 152 can be a conventional reed switch that includes two ferromagnetic blades which are typically hermetically sealed in a glass capsule. In one embodiment, the ends of the blades overlap in the capsule to form a gap, such that the reed switch is in a non-conductive (open) state. Upon application of a suitable magnetic field, the ends of the opposing blades come into contact with each other to form a closed circuit. The reed blades act as magnetic flux conductors when exposed to an external magnetic field from either a permanent magnet or an electromagnetic coil, as conventionally known in the art.

The reed switch 152 is mounted on the inner surface of the housing 130 in a similar manner as described with respect to FIG. 17, such that the switch mechanism 152 is positioned in the watertight compartment with other electronic components. The actuator 154 of the reed switch 150 includes a magnet 154 that is encased within a protective cover 138, which in the embodiment illustrated, is slidably mounted on the outer surface of the chassis 130 proximate the reed switch 152.

In one embodiment, the protective cover 138 is elongated in shape and is partially aligned over the reed switch 152. The protective cover 138 has a length that is greater than the length of the magnet 158 so that the magnet can be slidably moved from a non-engagement or non-activation position away from the reed switch 152 to an activation position directly over the reed switch 152, such that the housing is disposed therebetween the magnet and the reed switch 150.

In one embodiment, the upper portion of the elongated cover includes an elongated slot (not shown). The magnet 158 includes a handle 156 that extends, illustratively, perpendicular from the upper surface of the magnet 158 and extends through the slot. The handle 156 enables a user to slide the magnet 158 from the first non-activation position that is away from the reed switch 152 to a second activation position over the reed switch. When the magnet 158 is in the first position, the reed switch remains in its non-conductive open state and no user controlled signals are sent to the controller 160. When the user slides the magnet over the reed switch, the reed switch blades come into contact, i.e., close, which enables the reed switch to conduct in a conventional manner.

In another embodiment, the magnet is maintained at a separate storage location and, after observing operation of the cleaner in the pool, the user can manually position the magnet at a designated position on the exterior of the housing to actuate the switch, one or more times.

During operation of either of the embodiments of FIGS. 17 and 18, once the switch is actuated (enabled) by the user, an electrical signal from a power source (e.g., a voltage source) is provided to the processor 162 of the controller 160. As shown in FIGS. 17 and 18, the voltage source can be provided from the support circuitry, which can include an output voltage that is illustratively provided from a circuit card, the power supply, logic circuitry, among any other available voltage sources. The processor 162, in conjunction with the timing circuit 163, adjusts the duration that the pool cleaner is propelled (traverses) in a forward direction before turning and traversing in the reverse direction.

In one embodiment, repeated actuation of the switch will incrementally increase the distance the pool cleaner traverses across the pool. In particular, in response to the signal sent by the switch 150, the processor 162 produces an incremental increase in time that the pool cleaner traverses between the opposing sidewalls. For example, each signal produced by the end-user activation of the switch 150 produces an incremental increase of approximately three to five seconds (3-5 sec.) for time between reversing.

In one embodiment, the pool cleaner 100 can be incrementally increased up to fifteen seconds over the factory or dealer installed settings. In one embodiment, the switch 150 is repeatedly actuated by switching between the actuated and non-actuated switch positions. For example, if the switch is a button, then the button can be pressed repeatedly. Similarly, if the switch 150 is a reed switch, as shown in FIG. 18, then the magnet is withdrawn from its activation position over the reed switch to the second non-actuated position, and then returned back over the first activation position in a repeated manner. Thus, each time the switch 150 is actuated, the duration that the pool cleaner traverses in the forward direction before reversing is incrementally increased by three to five seconds. For example, if the factory or dealer-installed cleaning pattern program is set for a time of ten (10) seconds between changes of direction, the end user can increase the time up to twenty-five (25) seconds by activating the switch 150 three (3) times, in an instance where each activation produces a five (5) second increment. Once the maximum 25 seconds has been achieved, an additional activation of the switch 150 will return the controller program settings to the original factory or dealer default settings. Accordingly, the factory or dealer installed settings can be incrementally increased and then reset in cyclical manner.

In an alternative embodiment, a second or default switch (not shown) can be provided, illustratively, proximate switch 150 to send a signal to the processor 162 to automatically reset the programming back to the default (e.g., factory/dealer) settings. In this manner, the end-user does not have to repeatedly actuate switch 150 to cycle past the maximum time period to reset the programming to the default settings.

In one embodiment of the present invention, the cleaning pattern eliminates the undesirable slippage between the brushes and the surface of the pool, by controlling the rate of rotation of the brushes from a stopped or halted state when starting up or reversing direction. This is achieved by adjusting the power to the drive motor so that the brush accelerates from a stopped position to a first predetermined rate for a first predetermined time period. Thereafter, the brush rotational speed is maintained at the first predetermined rate for a second predetermined time period or for sufficient time to complete the turn, and then rotational rate of the brushes is increased to the maximum or normal rate of rotation to drive the pool cleaner forward, without slippage, in a controlled manner.

In a second embodiment of the invention, a pool cleaning pattern is provided in which the pool cleaner traverses more than half-way between opposing sidewalls, before turning and reversing direction. As the pool cleaner advances in clockwise (or counter-clockwise) direction around the perimeter of the pool, the interior portions of the cleaning patterns overlap, thereby assuring cleaning of the entire bottom of the pool.

In a third embodiment of the invention, a switch, such as a rotatable or push button switch, or reed switch and magnet is provided to incrementally increase the time, and consequently, the distance the pool cleaner traverses between opposing side walls before turning and reversing direction. In this manner, the end-user can manually change the factory or dealer program settings to increase the coverage between opposing side walls before the pool cleaner turns and reverses direction. The end-user can control the programming of the pool cleaner to provide greater cleaning coverage, which is especially advantageous in instances where the pool is irregular shaped or over-sized.

It is noted that method 1500, the pool cleaning pattern of FIG. 16, and the embodiments of FIGS. 17 and 18 for controlling the distance that the pool cleaner traverses in a direction away from a sidewall is also applicable to a pool cleaner that is equipped with a pair of opposing wheels, rollers or other type of rotational support members mounted on an axle for supporting the cleaner during movement, instead of a pair of brushes. In this embodiment, the pool cleaner includes a front axle with opposing front right and left wheels mounted on the ends of the front axle, and a rear axle with opposing rear right and left wheels mounted on the ends of the rear axle. For example, the right rear wheel is the driven wheel which receives power from the drive-motor 110 via the rear axle, while the opposing left rear wheel is the free wheel. For a detailed understanding of a pool cleaner having a pair of axles with front and rear wheels or rollers for propelling the cleaner, the reader is directed to commonly owned U.S. Pat. No. 7,165,284, issued Jan. 23, 2007, which is a division of U.S. Pat. No. 6,742,613, issued Jun. 1, 2004, which is a division of U.S. Pat. No. 6,412,133, issued Jul. 2, 2002, the content of these patents being incorporated by reference herein in their entireties.

Although various embodiments that incorporate the teachings of the present invention have been shown and described in detail herein, those skilled in the art can readily devise many other varied embodiments that still incorporate these teachings.

We claim:

1. A method of controlling the directional movement of a self-propelled robotic pool cleaner while cleaning a pool comprising the steps of:
   (a) propelling the pool cleaner in a first direction along a generally straight path away from a first sidewall toward an opposing sidewall of the pool, wherein said pool cleaner is propelled to a turning point in the pool that is at a distance greater than the midpoint between the first sidewall and the opposing sidewall and displaced from the opposing sidewall of the pool;
   (b) stopping the pool cleaner at the turning point and radially pivoting the pool cleaner at a first angle with respect to the first direction to cause a predetermined angular change in direction; and
   (c) resuming the propulsion of the pool cleaner in a reverse direction to return to the first sidewall in a second direction along a generally straight path that is angularly displaced from the first direction.

2. The method of claim 1, further comprising the step of repeating steps (a) through (c) in one of either a clockwise or counter-clockwise direction around the pool.

3. The method of claim 2, further comprising the step of propelling said pool cleaner up a sidewall of said pool while traversing in at least one of the first and second directions.

4. The method of claim 2, further comprising the step of manually controlling the distance the pool cleaner moves past the midpoint between the opposing sidewalls.

5. The method of claim 4, wherein said step of manually controlling the distance the pool cleaner moves comprises receiving a signal from a user-actuated switch.

6. The method of claim 5, wherein said step of manually increasing the distance the pool cleaner moves comprises initiating a series of activation signals that incrementally increase the distance the pool cleaner moves past said midpoint between the opposing sidewalls.

7. The method of claim 1, wherein said propelling the pool cleaner a distance greater than the midpoint between opposing sidewalls of the pool comprises the step of setting a first predetermined time that the pool cleaner is propelled in the first direction.

8. The method of claim 7, further comprising the step of manually setting a second predetermined time that the pool cleaner is propelled in the first direction.

9. The method of claim 8, wherein the second predetermined time is incrementally added to a value associated with the first predetermined time.

10. The method of claim 1 further comprising the steps of:
(d) stopping the pool cleaner at the first sidewall and radially pivoting the pool cleaner to effect a predetermined angular change such that a longitudinal axis of the cleaner is positioned normal to the first sidewall; and
(e) repeating steps (a) through (d).

11. The method of claim 1, wherein said stopping step includes radially pivoting the pool cleaner at the first angle in a clockwise direction with respect to the first direction.

12. The method of claim 1, wherein said stopping step includes radially pivoting the pool cleaner at the first angle in a counter-clockwise direction with respect to the first direction.

* * * * *